United States Patent
Waki

(10) Patent No.: US 10,721,085 B2
(45) Date of Patent: Jul. 21, 2020

(54) TERMINAL DEVICE, CONFERENCE MANAGEMENT SYSTEM, STORAGE MEDIUM AND CONFERENCE MANAGEMENT METHOD

(71) Applicant: SHARP KABUSHIKI KAISHA, Sakai, Osaka (JP)

(72) Inventor: Midori Waki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 49 days.

(21) Appl. No.: 16/201,997

(22) Filed: Nov. 27, 2018

(65) Prior Publication Data

US 2019/0165963 A1  May 30, 2019

(30) Foreign Application Priority Data

Nov. 27, 2017  (JP) ................. 2017-227208

(51) Int. Cl.
  *H04L 12/18*  (2006.01)
  *H04L 29/08*  (2006.01)
  (Continued)

(52) U.S. Cl.
  CPC .......... *H04L 12/1813* (2013.01); *G06F 16/13* (2019.01); *G06F 16/51* (2019.01);
  (Continued)

(58) Field of Classification Search
  CPC ............. H04L 12/1813; H04L 12/1818; H04L 67/125; H04L 67/2809; H04L 67/1097;
  (Continued)

(56) References Cited

U.S. PATENT DOCUMENTS 7,016,935 B2 *  3/2006  Lee .................. G06F 3/033
                                                 709/204
7,810,020 B2 * 10/2010  Omura ............. G06F 16/4393
                                                 715/200
(Continued)

FOREIGN PATENT DOCUMENTS

JP       2004-171526 A    6/2004
JP       2016-197285 A   11/2016

*Primary Examiner* — Michael Won
(74) *Attorney, Agent, or Firm* — ScienBiziP, P.C.

(57) ABSTRACT

A terminal device is connectable to a management server and a file server. The management server is connectable to multiple service servers, each of which provides a communication service. The file server stores a file used in the communication service. The terminal device includes a processor and a memory storing a program that causes the processor to execute control of the terminal device to function as: a conference information receiving unit configured to receive conference information, which is information about a conference booked through the communication services provided by the multiple service servers, the conference information being received from the management server, a file obtaining location specifying unit configured to specify, as a file obtaining location, a storage location storing the file used in the communication service, on the basis of the conference information, and a file obtaining unit configured to obtain the file from the specified storage location.

8 Claims, 25 Drawing Sheets

US 10,721,085 B2

Page 2

(51) Int. Cl.
*H04M 3/56* (2006.01)
*G06F 16/51* (2019.01)
*G06F 16/13* (2019.01)

(52) U.S. Cl.
CPC ........ *H04L 12/1818* (2013.01); *H04L 67/125* (2013.01); *H04M 3/567* (2013.01)

(58) Field of Classification Search
CPC ... H04L 65/4038; H04M 3/567; H04M 3/565; H04M 3/563; G06F 16/51; G06F 16/13; H04N 7/15; H04N 7/152; G06Q 10/1095
USPC ........................................................ 709/204
See application file for complete search history.

(56) References Cited

U.S. PATENT DOCUMENTS

| | | | |
|---|---|---|---|
| 7,856,473 B2 | 12/2010 | Horikiri et al. | |
| 2002/0169832 A1* | 11/2002 | Lee .................. | G06Q 10/10 709/205 |
| 2003/0208536 A9* | 11/2003 | Lee .................. | G06F 3/033 709/204 |
| 2004/0128354 A1 | 7/2004 | Horikiri et al. | |
| 2011/0225549 A1* | 9/2011 | Kim .................. | G06F 3/04883 715/838 |
| 2014/0298206 A1* | 10/2014 | Kurosawa ........... | G06Q 10/10 715/753 |
| 2014/0362165 A1* | 12/2014 | Ackerman ........... | H04L 65/4076 348/14.07 |
| 2019/0165963 A1* | 5/2019 | Waki ................. | H04L 12/1818 |

* cited by examiner

FIG. 2
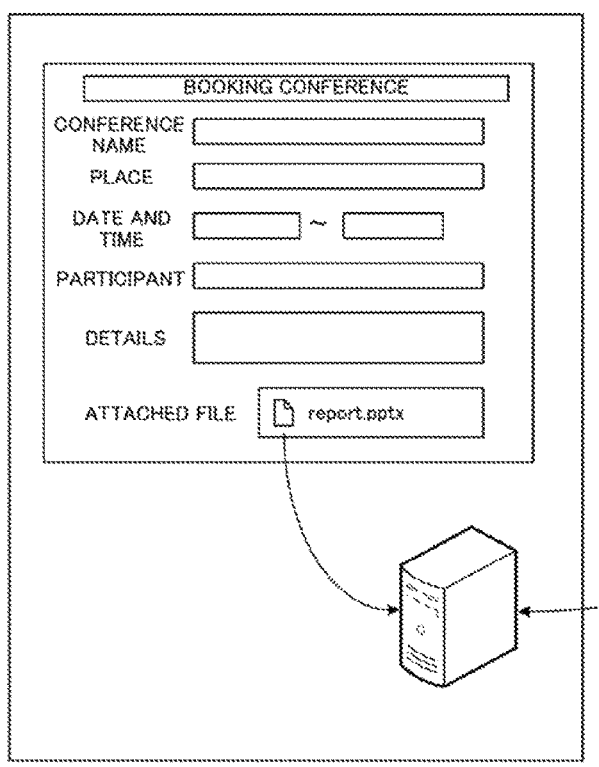
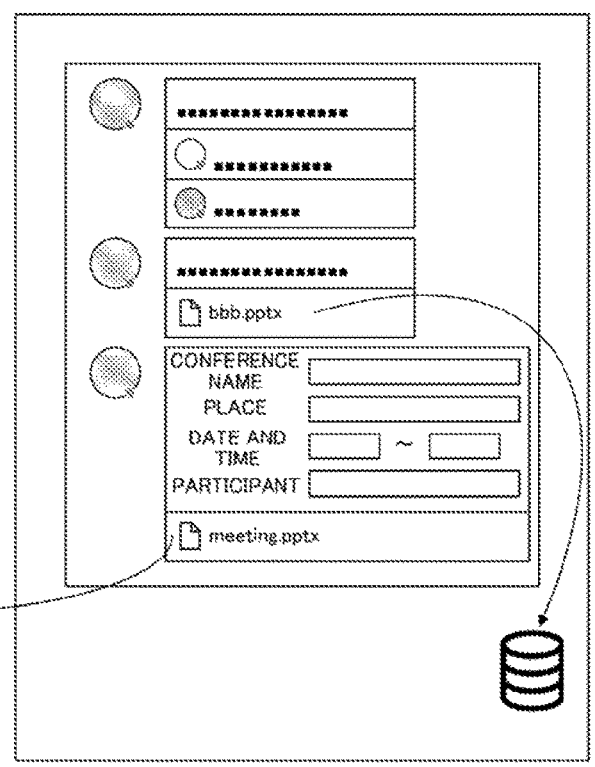

FIG. 4

| SERVICE ID | CONFERENCE NAME | STARTING DATE AND TIME | ENDING DATE AND TIME | PARTICIPANT | ADDITIONAL INFORMATION |
|---|---|---|---|---|---|
| SERVICE A | 2019 MODEL INFORMATION SHARING | 2017/11/14 15:00 | 2017/11/14 16:00 | User1,User3,User4,User6 | |
| SERVICE B | SOLUTION DESIGN MTG | 2017/11/15 10:00 | 2017/11/15 11:00 | User1,User4,User5,User7 | CHANNEL NAME = Patent |
| ⋮ | ⋮ | ⋮ | ⋮ | ⋮ | ⋮ |

FIG. 5

| PARTICIPANT ID | PASSWORD | E-MAIL ADDRESS | ATTRIBUTE | |
|---|---|---|---|---|
| | | | NAME | POSITION |
| User1 | aaa12345 | user1@example.com | SATO | DEPARTMENT CHIEF |
| User2 | bbb12345 | user2@example.com | TANAKA | DIRECTOR |
| ⋮ | ⋮ | ⋮ | ⋮ | ⋮ |

FIG. 6

| SERVICE ID | CONFERENCE NAME | ATTACHED FILE STORAGE AREA |
|---|---|---|
| SERVICE A | AAA MEETING | /files/SERVICE A/AAA MEETING |
| SERVICE B | BBB CONFERENCE | /files/SERVICE B/BBB CONFERENCE |
| ⋮ | ⋮ | ⋮ |

FIG. 8

| SERVES ID | PRIORITY | FILE TYPE | FILE OBTAINING LOCATION |
|---|---|---|---|
| SERVICE A | 1 | ATTACHED FILE | CONFERENCE INFORMATION MANAGEMENT SERVER/[SERVICE ID]/[CONFERENCE NAME] |
| SERVICE A | 2 | PAST CONFERENCE FILE | Cloud1/#MyMeeting/[CONFERENCE NAME]/[DATE] |
| SERVICE A | 3 | SHARED FILE | Cloud1/#MyMeeting/[TEAM NAME] |
| SERVICE B | 1 | ATTACHED FILE | CONFERENCE INFORMATION MANAGEMENT SERVER/[SERVICE ID]/[CONFERENCE NAME] |
| SERVICE B | 2 | PAST CONFERENCE FILE | Cloud2/[CONFERENCE NAME]/[DATE] |
| SERVICE B | 3 | CHANNEL FILE | Cloud2/[TEAM NAME]/[CHANNEL NAME] |
| SERVICE C | 1 | CHANNEL FILE | Cloud3/[TEAM NAME]/[CHANNEL NAME] |
| SERVICE C | 2 | PAST CONFERENCE FILE | Cloud3/[CONFERENCE NAME]/[DATE] |
| SERVICE C | 3 | FILE SHARED BY APPLICANTS | Cloud3/Users/[PARTICIPANT ID] |
| ⋮ | ⋮ | ⋮ | ⋮ |
| ALL | 9 | FILE FOR LOGGED-IN APPLICANTS | MyCloud/[PARTICIPANT ID OF LOGGED-IN PARTICIPANT] |

FIG. 9

| FILE TYPE | FILE NAME | THUMBNAIL FILE NAME |
|---|---|---|
| ATTACHED FILE | meetings.pptx | meetings.pptx.png |
| ATTACHED FILE | summary.xslx | summary.xslx.png |
| ⋮ | ⋮ | ⋮ |

FIG. 20

| FILE NAME | STATE |
|---|---|
| meetings.pptx | UPDATED |
| summary.xslx | OPENED |
| ⋮ | ⋮ |

FIG. 21

| SERVICE ID | FILE SAVING LOCATION |
|---|---|
| SERVICE A | PAST CONFERENCE FILE |
| SERVICE B | PAST CONFERENCE FILE |
| SERVICE C | Cloud1/Archive/[CONFERENCE NAME]/[DATE] |

TERMINAL DEVICE, CONFERENCE MANAGEMENT SYSTEM, STORAGE MEDIUM AND CONFERENCE MANAGEMENT METHOD

BACKGROUND OF THE INVENTION

1. Technical Field

The present invention relates to a terminal device, etc., connectable to a management server and a file server. The management server is connectable to a plurality of service servers, each of which provides a communication service. The file server is used in the communication service for storing a file.

2. Description of the Background Art

In recent years, a conferencing system has been commonly used. By use of a conferencing system, for example, it is possible to save a handout to be used at a conference in advance in a file server and, by such a way as displaying the handout on a large display at the time of having the conference, it is possible to share information with participants of the conference. Furthermore, depending on the type of a conference, techniques for making it easier to share information or grasp a conference have been proposed as well.

For example, a remote conferencing system in which a shared workspace server, which is provided for performing connection and information sharing between conferencing systems, connects itself to conferencing systems located at multiple sites to enable the multiple conferencing systems to cooperate with each other has been proposed. The workspace server realizes sharing of information by managing reference information of files and resources (e.g., Japanese Unexamined Patent Application Publication No. 2004-171526).

Moreover, a conference management device capable of obtaining past conference information through a simple operation has been proposed. The conference information includes file information about a conference handout distributed in the conference held in the past and, when the file is selected, the contents are displayed. Therefore, it is easy to grasp an overview of the conference and it is possible to prevent conference information from not being obtained as well (e.g., Japanese Unexamined Patent Application Publication No. 2016-197285).

In addition, management of files using online storage (i.e, cloud storage) is becoming popular. Furthermore, depending on services for booking a conference, it is possible to attach a file to be used in the conference when booking the conference. Here, the attached file may be stored in online storage. As described above, efficiency of information sharing in a conference is realized by use of multiple services.

SUMMARY OF THE INVENTION

However, in a case of using multiple services for booking a conference, a device or place where a file is stored has differed for each service. Furthermore, in a case where a file used in a conference in the past is used again, there has been a need to attach the file again when booking a conference. As described above, there has been a problem that it takes time and effort to obtain or to download, from online storage, a file desired to be used in a conference.

In view of such an issue as described above, the object of the present invention is to provide a terminal device, etc., that is capable of providing necessary information even when a conference is booked through multiple services.

To solve such an issue as described above, the terminal device according to the present invention is a terminal device connectable to a management server and a file server, the management server being connectable to a plurality of service servers, each of which provides a communication service, the file server storing a file used in the communication service. The terminal device includes a processor and a memory storing a program that causes the processor to execute control of the terminal device to function as: a conference information receiving unit configured to receive conference information, which is information about a conference booked through the communication services provided by the plurality of service servers, the conference information being received from the management server; a file obtaining location specifying unit configured to specify, as a file obtaining location, a storage location storing the file used in the communication service, on the basis of the conference information; and a file obtaining unit configured to obtain the file from the specified storage location.

The conference management system according to the present invention is a conference management system including a management server, a file server, and a terminal device, the management server being connectable to a plurality of service servers, each of which provides a communication service, the file server storing a file used in the communication service, the terminal device being connectable to the plurality of service servers and the file server. The management server includes a first processor and a first memory storing a program that causes the first processor to execute control of the management server to function as: an obtaining unit configured to obtain information about a conference booked through the communication services provided by the plurality of the service servers; and a conference information transmitting unit configured to transmit conference information to the terminal device, the conference information including the information about the booked conference and information for specifying the communication service used for booking the conference. The terminal device includes a second processor and a second memory storing a program that causes the second processor to execute control of the terminal device to function as: a conference information receiving unit configured to receive the conference information from the management server; a file obtaining location specifying unit configured to specify, as a file obtaining location, a storage location storing the file used in the communication service, on the basis of the conference information; and a file obtaining unit configured to obtain the file from the specified storage location.

The recording medium according to the present invention is a non-transitory storage medium storing a program that causes a computer to execute control of a terminal device connectable to a management server and a file server, the management server being connectable to a plurality of service servers, each of which provides a communication service, the file server storing a file used in the communication service. The program causes the computer to function as: a conference information receiving unit configured to receive conference information, which is information about a conference booked through the communication service, the conference information being received from the management server; a file obtaining location specifying unit configured to specify, based on the conference information, a storage location storing the file used in the communication service, the storage location being specified as a file obtaining location; and a file obtaining unit configured to obtain the file from the specified storage location.

The conference management method according to the present invention is a conference management method for a conference management system including a management server, a file server, and a terminal device, the management server being connectable to a plurality of service servers, each of which provides a communication service, the file server storing a file used in the communication service, the terminal device being connectable to the plurality of service servers and the file server. The conference management method for the management server includes: obtaining information about a conference booked through the communication services provided by the plurality of service servers; and transmitting conference information to the terminal device, the conference information including the information about the booked conference and information for specifying the communication service used for booking the conference.

The conference management method for the terminal device includes: receiving the conference information from the management server; specifying, as a file obtaining location, a storage location storing the file used in the communication service, on the basis of the conference information; and obtaining the file from the specified storage location.

According to the present invention, a file obtaining location is specified based on conference information of a conference booked through a service, so that a file is obtained from the file obtaining location. Therefore, it is possible for a participant of the conference to obtain the file without being aware as to which service was used for booking the conference.

BRIEF DESCRIPTION OF THE DRAWINGS

FIG. 2 is a diagram for explaining an overview of a service for booking a conference in the first embodiment;

FIG. 4 is a diagram illustrating an example of a data configuration of conference information in the first embodiment;

FIG. 5 is a diagram illustrating an example of a data configuration of participant information in the first embodiment;

FIG. 6 is a diagram illustrating an example of a data configuration of service allocation information in the first embodiment;

FIG. 8 is a diagram illustrating an example of a data configuration of file obtaining location information in the first embodiment;

FIG. 9 is a diagram illustrating an example of a data configuration of obtaining file information in the first embodiment;

FIG. 20 is a diagram illustrating an example of a data configuration of file usage history information in the third embodiment;

FIG. 21 is a diagram illustrating an example of a data configuration of file saving location information in the third embodiment;

DETAILED DESCRIPTION OF THE INVENTION

Hereinafter, embodiments of the present invention are explained with reference to the drawings. Note that, in the present embodiments, a conference management system including a conference room client to which the present invention is applied is explained as an example. Note that the conference in the present embodiments includes a meeting, a discussion, a lesson, or the like, where predetermined participants gather at a predetermined time and a predetermined place to share information or to have a discussion on an agenda.

1. First Embodiment

[1.1 Overall Configuration]

Figure 1:
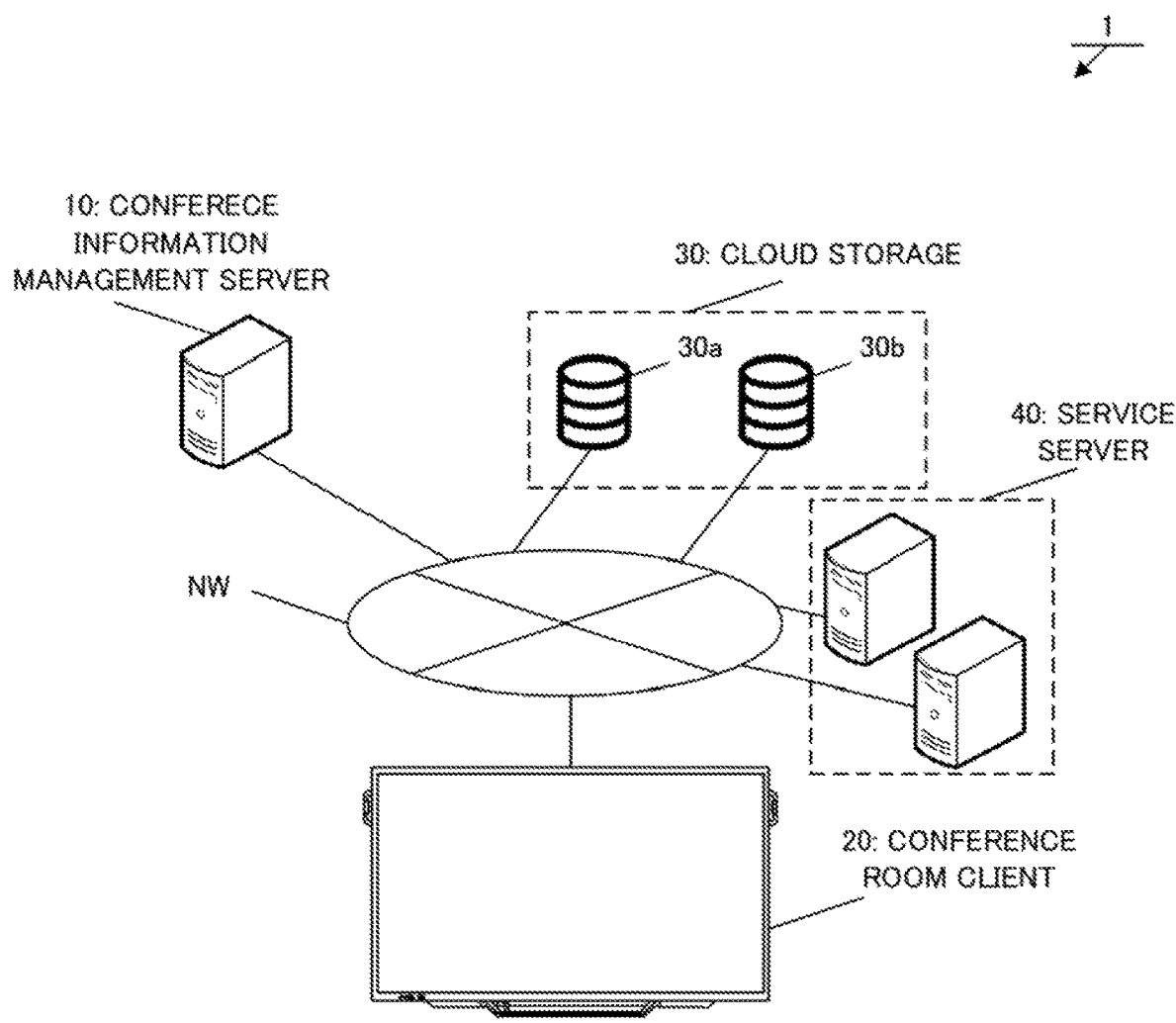
FIG. 1 is a diagram for explaining an overall configuration of the first embodiment.

An overall configuration of a conference management system 1 according to the present embodiment is explained with reference to FIG. 1. As illustrated in FIG. 1, the conference management system 1 includes: a conference information management server 10; a conference room client 20, which is a terminal device; a cloud storage 30 (including 30a and 30b), which is a file server, and a service server 40 for providing a communication service, which are capable of communicating via a network NW.

The network NW may be an internal network such as a LAN or an external network such as the Internet. Furthermore, each device may be wired or wireless as far as being capable of connecting to the network NW.

The conference information management server 10 is a management server that obtains information about booking of conferences from the service server 40 having a function of booking a conference and manages the information as conference information. The conference room client 20 is a device that receives conference information from the conference information management server 10 and displays a file used in a conference, based on the conference information.

Here, the cloud storage is a file server, that is, online storage (i.e., memory area) provided using cloud computing. A user can store a file (i.e., content) on a file server provided by a service provider, as necessary. Furthermore, each user may be assigned with a particular memory area (e.g., a memory device, a directory, or an area that can be set to have a predetermined capacity). Regarding the areas, files stored in an area that is set to be shared can be referred to by each user.

Furthermore, although there are two connectable services, i.e., the cloud storages 30a and 30b, there may be provided only one cloud storage service or there may be provided more cloud storage services.

Furthermore, although a cloud storage is taken as an example of a memory location of a file for the sake of explanation in the present embodiment, a single file management server or a NAS (Network Attached Storage) may be used as a file server.

[1.2 Explanation of Service in the Present Embodiment]

Here, a basic service used in the present embodiment is explained with reference to FIG. 2. In FIG. 2, screen examples of two communication services having different features are described. Here, with reference to FIG. 2, a method for booking a conference through a service is explained.

Here, a communication service is a comprehensive service for providing a user with various communication means. For example, a service for displaying messages of one-to-one or multiple participants are displayed on a timeline as well as various services such as a mail, a bulletin board, and booking of a conference are included. In the present embodiment, SERVICE A and SERVICE B below are explained.

Note that the communication service may be provided as a part of the conference management system. Further, an external service may be used for the communication service. Furthermore, in the present embodiment, the communication service is simply referred to as a service.

The communication service A (hereinafter referred to as SERVICE A) in FIG. 2 is a service for booking a conference. For example, it is assumed that there is a screen for booking a conference and, on the screen, a conference name, a place, a date and time of having the conference, a participant, an attached file, etc., can be entered. Furthermore, in a case where a conference is booked, the attached file is stored in a file server, which is a storage location associated with SERVICE A. Note that the file server may be a service server itself or a shared folder of another computer. For example, in SERVICE A as explained in FIG. 2, the attached file is stored in the memory area of the conference information management server 10. Further, without providing a screen for booking a conference, booking of a conference may be done by an e-mail, for example.

The communication service B (hereinafter referred to as SERVICE B) in FIG. 2 is a conference service in which a conversation such as chatting can be used. In SERVICE B, a timeline function for displaying messages in a chronological order as a conversation is provided, so that a user of SERVICE B can post a message or a text. Furthermore, it is possible to upload a file on the timeline, so that a user using the conference service can refer to the uploaded file.

Such a file uploaded on the timeline as described above is stored in a storage location (e.g., cloud storage 30) associated with SERVICE B.

In SERVICE B, booking of a conference is possible on the timeline. For example, in SERVICE B, a message for setting a date and time, a place of the conference, etc., may be entered in a conversation. Further, a booking function may be called and executed.

Furthermore, a user of SERVICE B can attach a file when booking a conference. Here, the file uploaded on the timeline is a file used in a conference, and therefore is uploaded to the conference information management server 10. Note that the attached file may be stored in the location associated with SERVICE B (e.g., memory area of the cloud storage 30) as well.

Here, there may be a case in which locations (i.e., devices) for storing files (i.e., uploaded files) transmitted from a user are different from each other, depending on the service type or the booking method. Therefore, when starting a conference service, a participant of the conference has been required to confirm the service used for booking the conference and obtain a file in accordance with the service.

In the present embodiment, the conference information management server 10 obtains information about booking of conferences (hereinafter referred to as "booking information") from one or more communication services. Furthermore, it is possible to obtain a file from a storage location of files, which is associated with a communication service. Accordingly, it is possible to obtain a file at the time of starting a conference without being aware of the service used for booking the conference.

Note that, although the above explanation is provided on the basis that a service is assigned with a location to store a file, it is possible that a service is assigned with multiple locations. For example, in SERVICE B, files may be stored in the cloud storage 30a in a case where multiple people are having a conversation and stored in the cloud storage 30b in a case of having a conversation in a one-to-one manner.

[1.3 Functional Configuration]

[1.3.1 Conference Information Management Server]

Figure 3:
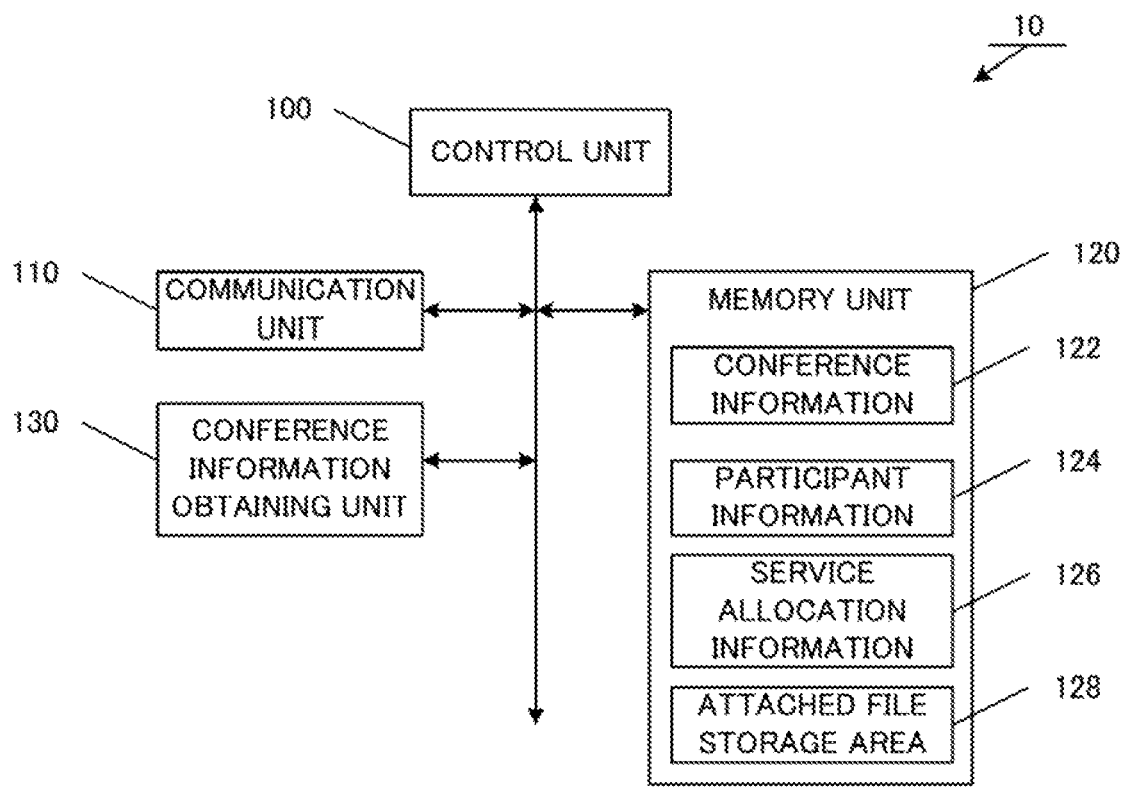
FIG. 3 is a diagram for explaining a functional configuration of a conference information management server in the first embodiment.

The conference information management server 10 is explained with reference to FIG. 3. The conference information management server 10 has a configuration including a control unit 100, a communication unit 110, a memory unit 120, and a conference information obtaining unit 130.

The control unit 100 is a function unit for entirely controlling the conference information management server 10. The control unit 100 realizes various kinds of functions by retrieving and executing various kinds of programs and is configured with, for example, a CPU (Central Processing Unit) or the like.

The communication unit 10 is a function unit for allowing the conference information management server 10 to connect to the network NW and to perform communication with another device (i.e., client, cloud storage, etc.). For example, the communication unit 110 is realized by an NIC (Network Interface Card) used in a wired or wireless LAN, a communication module connectable to 3G or LTE line, or the like.

The memory unit 120 is a function unit in which various kinds of programs and data necessary for operation of the conference information management server 10 are stored. The memory unit 120 is configured with, for example, an SSD (Solid State Drive), which is a semiconductor memory, an HDD (Hard Disk Drive), or the like.

In addition, in the memory unit 120, conference information 122, participant information 124, and service allocation information 126 are stored. Further, in the memory unit 120, an attached file storage area 128 for storing a file attached to information of a conference is secured.

In a case where a conference is booked through another service, the conference information 122 stores booking information, which is information about booking of the conference. The booking information is obtained by the conference information obtaining unit 130 described below. For example, as illustrated in FIG. 4, there are stored: a service ID (e.g., "SERVICE A") for identifying a service used for booking a conference; a booked conference name (e.g., "2019 MODEL INFORMATION SHARING"); a starting date and time of a conference (e.g., "2017/11/14 15:00"); an ending date and time of a conference (e.g., "2017/11/14 16:00"); a participant of a conference (e.g., "User 1, User 3, User 4, User 6"); and additional information, which is added information about a conference.

To generate the conference information 122, the conference information obtaining unit 130 collects booking information, which is created when a conference is booked through a service used by a user of the conference management system 1. That is, the conference information 122 is generated by extracting, from booking information, such information as a conference name, a starting date and time, an ending date and time, and a participant, and by storing the service ID of a booking service and additional information, as necessary.

Here, additional information is, for example, a team name in a case where a team to have a conference is designated or a topic (i.e., channel name) of a timeline in a case of booking a conference from a timeline. In the information of booking, all information other than a conference name, a starting date and time, an ending date and time, and a participant may be stored as additional information. Alternatively, information that is predetermined, for each booking service, to be handled as additional information may be stored as additional information.

In addition, in a case where a file is attached to the obtained booking information, the attached file is stored in an attached file storage area 128 described below.

Furthermore, in the present embodiment, a participant ID of the participant information 124 described below is stored as a participant. However, information other than a participant ID may be stored, as far as a participant of a conference can be identified using the information. For example, the name or employee number of a participant may be stored.

Furthermore, in the conference information 122, an attribute related to a conference such as the host of a conference, the venue of a conference, or a department may be stored, in addition to the above-mentioned information.

The participant information 124 stores information necessary for authentication of a participant of a conference and for providing a notification as well as attributes of a participant. For example, as illustrated in FIG. 5, there are stored: a participant ID (e.g., "User 1") for identifying a participant; a password (e.g., "aaa12345"), which is information for authenticating a participant specified by the participant ID; an e-mail address (e.g., "user 1@example.com") used for notification of information; and an attribute, which is information about the participant. As an attribute, for example, attributes such as a name (e.g., "SATO") and a position (e.g., "DEPARTMENT CHIEF") are stored. Note that, in addition to the above-mentioned attributes, attributes such as department and employee number may be stored.

Further, information for authenticating a participant may be information other than a password. For example, in a case where biometric authentication is used for authentication of a participant, a fingerprint pattern or a face pattern may be stored, depending on the method for biometric authentication.

Service allocation information 126 is information storing information about a memory area of files in association with the service type or the like. Details are described later.

The attached file storage area 128 is an area for storing a file attached to booking information. In a case where an attached file is included in booking information, a folder is created for each service and conference name, so as to store the attached file in the folder, for example.

Furthermore, information associating conference information, which is stored in the conference information 122, and an attached file, which is stored in the attached file storage area 128, is stored in the service allocation information 126. For example, as illustrated in FIG. 6, the service allocation information 126 stores: a service ID (e.g., "SERVICE A") for specifying a service; a conference name (e.g., "AAA MEETING") for specifying a conference; and a storage location (e.g., "/files/SERVICE A/AAA MEETING") of a file attached to the reservation information of the conference.

The conference information obtaining unit 130 is a function unit that connects to a service server, through which a conference can be booked, to obtain booking information, which is information about booking of a conference, and stores the booking information in the conference information 122. Information about a service server to be connected (e.g., authentication information, etc., for logging in to a connection destination or a service server) may be stored in the memory unit 120 or may be designated by an administrator or the like of the conference management system 1 at the time of obtaining booking information.

After the reservation information is obtained, the conference name, the starting date and time of the conference, the ending date and time of the conference, the participant of the conference, and the additional information are extracted and stored in the conference information 122 together with the service ID of the service from which the booking information is obtained.

Obtainment of booking information may be performed on a regular basis or may be performed upon an operation by a manager or the like of the conference management system 1.

Note that, other than the above-described method for collecting booking information, in a case where a service server transmits booking information to the conference information management server 10, the transmitted booking information may be received and stored in the conference information 122. For example, in a case where booking information is transmitted to the conference information management server 10 via an e-mail when a conference is booked through a service server, the conference information may be stored in the conference information 122, based on the contents of the e-mail received by the conference information management server 10.

[1.3.2 Conference Room Client]

Figure 7:
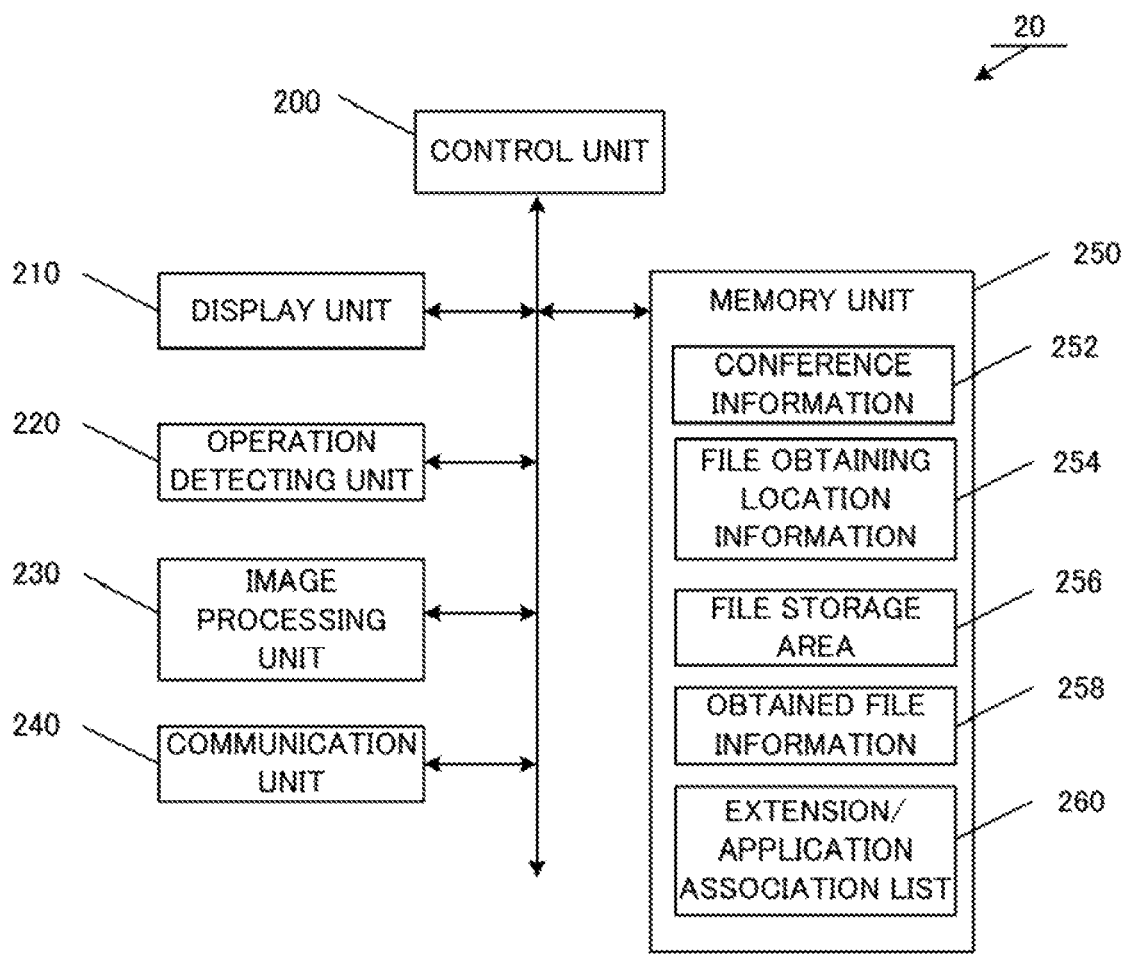
FIG. 7 is a diagram for explaining a functional configuration of a conference room client in the first embodiment.

Next, a functional configuration of the conference room client 20 is explained with reference to FIG. 7. Note that, in the present embodiment, explanation is provided on the basis that a display device that accepts touch operations is used as the conference room client 20. However, the conference room client 20 may be configured with a display control device and a display device. The conference room client 20 of the present embodiment has a configuration including a control unit 200, a display unit 210, an operation detecting unit 220, an image processing unit 230, a communication unit 240, and a memory unit 250.

The control unit 200 is a function unit for entirely controlling the conference room client 20. The control unit 200 realizes various kinds of functions by retrieving and executing various kinds of programs and is configured with, for example, a CPU, etc.

The display unit 210 is a function unit that displays a file such as a handout for a conference. For example, the display unit 210 is configured with an LCD (Liquid Crystal Display), an organic EL display (OELD: Organic Electroluminescence Display), or the like.

The operation detecting unit 220 is a function unit that detects a touched position and a touch operation with respect to a touch operation provided on the conference room client 20. For example, the operation detection unit 220 is overlaid on the display unit 210, such that a touch panel is configured. The touch method may be any method such as an electrostatic capacity method, a resistive film method, or an infrared method.

The image processing unit 230 is a function unit that performs various kinds of image processing on image data. For example, sharpening processing is performed on image data.

The communication unit 240 is a function unit for allowing the conference room client 20 to communicate with an external device. For example, the communication unit 240 is realized by an NIC used in a wired or wireless LAN, a communication module connectable to 3G or LTE line, or the like.

The memory unit 250 is a function unit in which various kinds of programs and data necessary for operation of the conference room client 20 are stored. The memory unit 250 is configured with, for example, an SSD, which is a semiconductor memory, an HDD, or the like.

Specifically, in the memory unit 250, conference information 252 and file obtaining location information 254 are stored. Further, in the memory unit 250, a file storage area 256 for storing a file received from the conference information management server 10 or the cloud storage 30 is secured. Furthermore, obtained file information 258 is stored as information related to a file stored in the file storage area 256. Further, an extension/application association list 260 is stored.

Out of conference information stored in the conference information 122, conference information related to a conference to be handled by the conference room client 20 is stored in the conference information 252.

The file obtaining location information 254 stores, based on the conference information 252, information that is necessary for determining a location to obtain a file from in a case of obtaining a file to be used in a conference. For example, as illustrated in FIG. 8, there are stored: a service ID (e.g., "SERVICE A") for specifying a service; a priority (e.g., "1"); a file type (e.g., "ATTACHED FILE") indicating the type of a file stored in a file obtaining location; and a file obtaining location (e.g., "CONFERENCE INFORMATION MANAGEMENT SERVER/[SERVICE ID]/[CONFERENCE NAME]") for specifying a memory area (i.e., location to obtain a file from) in which a file corresponding to the file type is stored.

A file type is information used to specify a file obtaining location. In the present embodiment, information below is stored.
    ATTACHED FILE: in a case where a file is attached to booking information
    PAST CONFERENCE FILE: in a case where a file used in a conference held in the past is indicated
    SHARED FILE: in a case where a file is shared by users
    FILE FOR LOGGED-IN PARTICIPANTS: in a case of a file shared by participants who have logged in to the conference management system 1
    FILE SHARED BY PARTICIPANTS: in a case of a file shared by participants of a conference held in the conference management system 1
    CHANNEL FILE: in a case where a file uploaded to a timeline of SERVICE B is indicated In addition, a file obtaining location indicates a location (e.g., folder, etc.) from which the conference room client 20 actually obtains a file. The file obtaining location may be a location for storing a file associated with a communication service or may be a location in which a file shared by participants is stored. Here, the parts bracketed by "[ ]" indicate parts where information according to situations, such as an attribute corresponding to the conference information, additional information, or date, is inserted.

For example, suppose that the service ID in the conference information 252 is "SERVICE A" and the conference name is "AAA MEETING" in a case where the file obtaining location is "CONFERENCE INFORMATION MANAGEMENT SERVER/[SERVICE ID]/[CONFERENCE NAME]". In this case, the conference room client 20 obtains a file from "CONFERENCE INFORMATION MANAGEMENT SERVER/SERVICE A/AAA MEETING". That is, the file is stored in a folder (i.e., directory) of "SERVICE A/AAA MEETING" located in the conference information management server 10.

Furthermore, a file obtaining location may be designated by the conference room client 20 according to a participant. For example, in a case where a shared folder used by participants participating in a conference should be the file obtaining location, "Cloud3/Users/[PARTICIPANT ID]" is designated. In a case where there are four participants in the conference, the conference room client 20 obtains a file from a folder shared by the four people, which is the file obtaining location. Furthermore, a folder shared by logged-in participants or a folder shared by participants having a specific attribute (e.g., participants whose position is department chief) may be designated as the file obtaining location.

Note that, although a file obtaining location may be set for each booking service, a file obtaining location from which a file is obtained regardless of booking services may be set as well. For example, in a case where "FILE FOR LOGGED-IN PARTICIPANTS" should be obtained in any conference, a file obtaining location with the service ID set to "ALL" may be included.

Furthermore, the priority indicates a rank based on which a file to be obtained is presented to participants of a conference. For example, in a case where the service ID of the conference information 252 is "SERVICE A", an attached file is preferentially presented to participants. By setting priority, it is possible to present participants with a file with higher relevancy to a conference from among files relevant to the conference.

Note that the file obtaining location information 254 may be preset in the conference room client 20. Further, it is also possible that the conference information management server 10 stores file obtaining location information, so that the conference room client 20 stores file obtaining location information delivered from the conference information management server 10.

A file obtained based on the file obtaining location information 254 is stored in the file storage area 256. Furthermore, information about an obtained file is stored in the obtained file information 258.

For example, in the obtained file information 258, as illustrated in FIG. 9, there are stored: a file type (e.g., "ATTACHED FILE") corresponding to an obtained file; a file name (e.g., "meetings.pptx") of the file; and a thumbnail file name (e.g., "meetings.pptx.png"), which is the file name of the thumbnail corresponding to the file.

In the present embodiment, the conference room client 20 receives thumbnail data from a file obtaining location and stores the thumbnail data as a thumbnail file in the file storage area 256. In addition, a file name of a thumbnail is created by adding a specific character string at the end of a corresponding file name, so that the file name of the thumbnail corresponds to a file. Note that the above-described configuration is not necessary. That is, any configuration may be possible as far as a file and a thumbnail are associated with each other.

Further, in the present embodiment, prior to obtaining a file (i.e., actual file) stored in a file obtaining location, a thumbnail is displayed for the file, instead of displaying the actual file. In the present embodiment, an area called a recommendation area is displayed on the display unit 210, and a thumbnail and a file name are displayed close to each other and aligned in a vertical manner inside the recommendation area, based on the obtained file information 258. Note that, other than displaying a thumbnail, a list of file names may be displayed, for example. Further, a file icon, a captured image, or the like may be displayed as a substitute for a thumbnail.

Furthermore, in the present embodiment, a list for selecting a file type (i.e., a file type selecting list) is displayed. Below explanation is provided on the basis that, in the recommendation area, a thumbnail of a file obtained from a file obtaining location associated with a file type selected from the file type selecting list is displayed.

In the extension/application association list 260, there are stored: an extension (e.g., ".pptx") of a file; and an application (e.g., presentation application) to be activated when a file including the extension in the file name is used. When using an obtained file, in a case where an extension of the file is stored in the extension application association list 260, the file is displayed using the corresponding application.

Note that, for an application activated when using a file, it is only necessary that an application can be specified. For this end, an application name, a path to the application name, or the like may be stored.

[1.4 Process Flow]
[1.4.1 Overall Processing]

Processing in the present embodiment is explained. First, with reference to FIG. 10, data transmitted and received between devices is explained.

First, the conference room client 20 transmits authentication information to the conference information management server 10 (S1002). The authentication information is transmitted for the conference information management server 10 to perform authentication processing of a participant. The authentication information includes a participant ID and a password.

Here, as a method for a participant of a conference to enter authentication information, there may be a method in which a card storing a participant ID and a password is read by a card reader connected to the conference room client 20 or a method in which a participant ID and a password are entered. In addition, in a case of performing authentication of a participant by use of biometric authentication, physical characteristics may be read by use of a device such as a fingerprint sensor or a camera, depending on the method of biometric authentication, and transmitted as authentication information.

The conference information management server 10 performs authentication processing, based on the authentication information transmitted from the conference room client 20 and authentication information (e.g., a participant ID and a password) stored in the participant information 124 (S1004). For example, in a case where the authentication information transmitted from the conference room client 20 matches with the authentication information stored in the participant information 124, the conference information management server 10 determines that the authentication result is "authentication succeeded". Furthermore, in a case where the authentication information transmitted from the conference room client 20 does not match with the authentication information stored in the participant information 124 or in a case where authentication information is not registered, the authentication result is determined to be "authentication failed". Further, the conference information management server 10 transmits the above-described authentication information to the conference room client 20 (S1006).

In a case where the authentication result is "authentication succeeded", the conference room client 20, which has received the authentication result, transmits a conference information request to the conference information management server 10 (S1008). The conference information management server 10 extracts, from the conference information 122, conference information in which the participant ID corresponding to the conference information request is included as a participant (S1010). Then, the conference information management server 10 transmits the extracted conference information to the conference room client 20 (S1012).

The conference room client 20, which has received the conference information, selects one conference information out of the received conference information (S1014). Furthermore, the conference room client 20 stores the selected conference information as the conference information 252.

Subsequently, based on the conference information 252 and the file obtaining location information 254, the control unit 200 transmits a file request to a file obtaining location in order from higher priority.

For example, in a case where the device having the file obtaining location with the highest priority is the conference information management server 10, the control unit 200 transmits to the conference information management server 10 a file request to request for transmitting a file stored in the file obtaining location (S1016). The conference information management server 10, which has received the file request, transmits to the conference room client 20 a file name and a thumbnail data stored in the area identified as the file obtaining location (S1018). Then, the control unit 200 of the conference room client 20 receives the file name and the thumbnail from the conference information management server 10.

Figure 10:
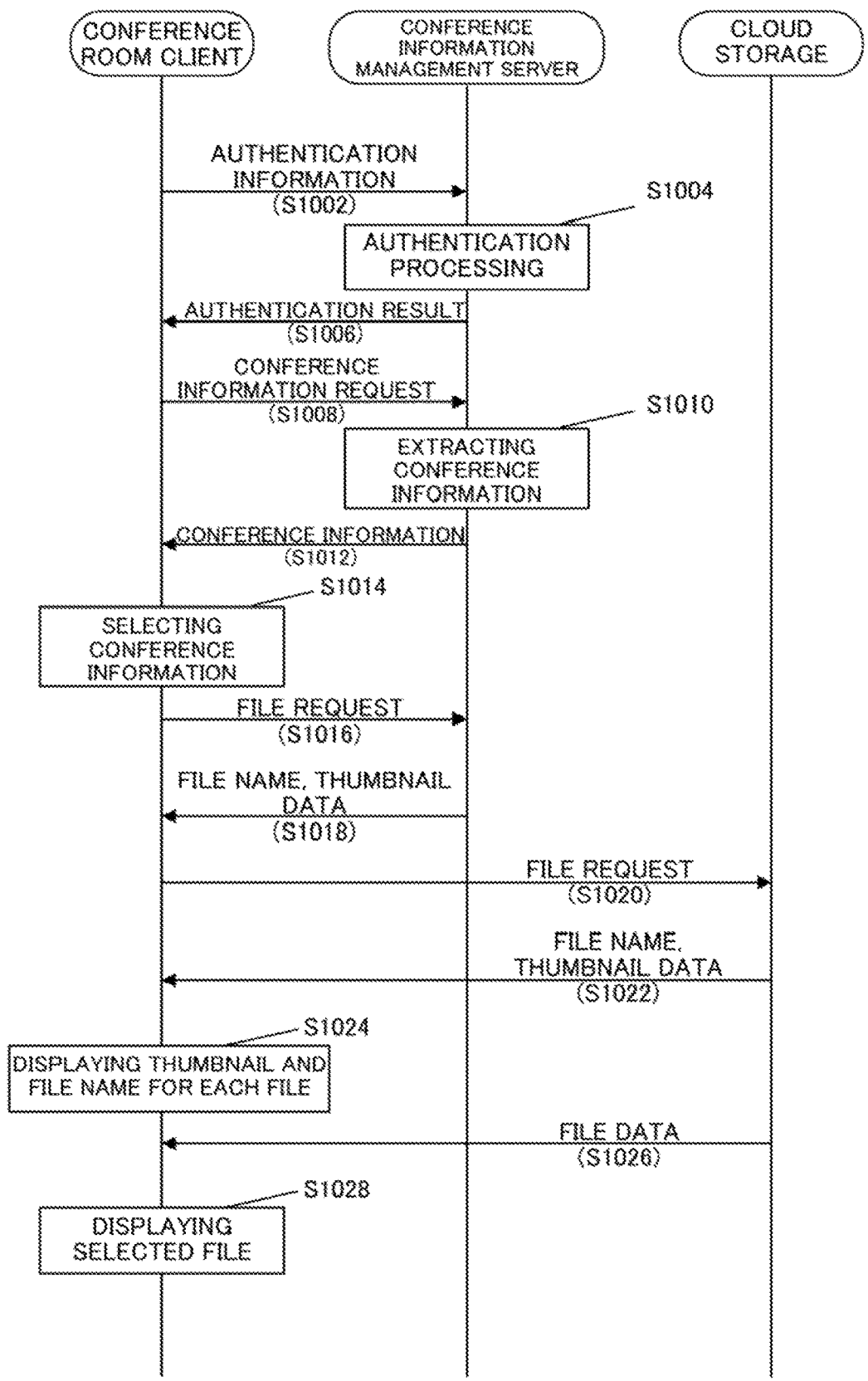
FIG. 10 is a diagram for explaining a sequence in the first embodiment.

Subsequently, in a case where there is a file obtaining location with the next highest priority, a file request is transmitted in the same manner as in S1016 (S1020). In FIG. 10, the file request is transmitted to the cloud storage 30. The device that has received the file request transmits a file name and thumbnail data to the conference room client 20 in a similar manner as in S1018 (S1022).

As described above, the control unit 200 of the conference room client 20 transmits a file request based on a file obtaining location. Furthermore, information about an obtained file (e.g., file name and/or thumbnail) is displayed in a recommendation area for each file (S1024). Furthermore, file data may be received together with thumbnail data or may be received separately (S1026).

In a case where such an operation for displaying a file as selecting a thumbnail is provided by the participant, the control unit 200 of the conference room client 20 performs a process of displaying the selected file (S1028). Note that, in a case where the file data to be displayed has not been obtained yet when the file is selected, it is possible to obtain the file data after the file is selected.

[1.4.2 Processing of Conference Room Client]

Next, with reference to FIG. 1, the process flow of the conference room client 20 is explained. First, the control unit 200 performs authentication of a participant (Step S102). In a case where the authentication of the participant has succeeded, conference information corresponding to the participant ID is obtained from the conference information management server 10 (step S104).

Subsequently, the control unit 200 stores one conference information out of the obtained conference information as conference information 252 (Step S106). The determination of one conference information to be stored as the conference information 252 may be made by allowing the participant to select from the conference information or may be made by the conference room client 20.

As the method for the conference room client 20 to determine one conference information, there may be such a method as, in a case where there is conference information whose time range of the conference covers the current time, the conference information is determined to be conference information about a conference currently being held, and thereby determined to be the one conference information. Note that, considering that participants perform authentication before the start of a conference, there may be such a case as, in a case where the current time is within a predetermined range of time (e.g., within 30 minutes) before the starting date and time of conference information, the conference information is determined as the one conference information.

Note that, in a case where no conference information can be obtained from the conference information management server 10, the participant may be notified that there is no selectable conference information.

Subsequently, the control unit 200 performs a process of displaying a conference details screen on the display unit 210 (Step S108). Here, the conference details screen is a screen for displaying a conference name, a starting date and time, an ending date and time, information about an obtained file, etc., based on the conference information 252. Furthermore, a participant of a conference confirms the conference details screen and selects whether to start the conference.

In a case where the start of the conference is selected by the participant of the conference, the control unit 200 performs a process (i.e., initial screen displaying process) of displaying the initial screen to be displayed on the display unit 210 at the time of starting a conference (Step S112 in a case of Yes in Step S110). Here, the initial screen displaying process is explained with reference to FIG. 12.

First, the control unit 200 retrieves from the file obtaining location information 254 file obtaining locations in which a file related to the conference is stored, based on the service ID of the conference information 252, and selects the file obtaining locations (Step S152).

Subsequently, among the selected file obtaining locations, the control unit 200 transmits file requests to devices corresponding to the file obtaining locations in order from a file obtaining location with higher priority (Step S154).

Subsequently, as a response to a file request, the control unit 200 receives a file name and a thumbnail transmitted from a device having a file obtaining location (Step S156). Furthermore, the service ID and the received file name and file name of the thumbnail are stored in obtained file information 258.

Subsequently, based on the information stored in the obtained file information 258, the control unit 200 displays the file name and the thumbnail, which have been obtained from the file obtaining location with the highest priority, in the recommendation area for each file corresponding to the thumbnail (Step S158). Furthermore, the file is obtained from the file obtaining location and stored in the file storage area 256 (Step S160).

Figure 12:
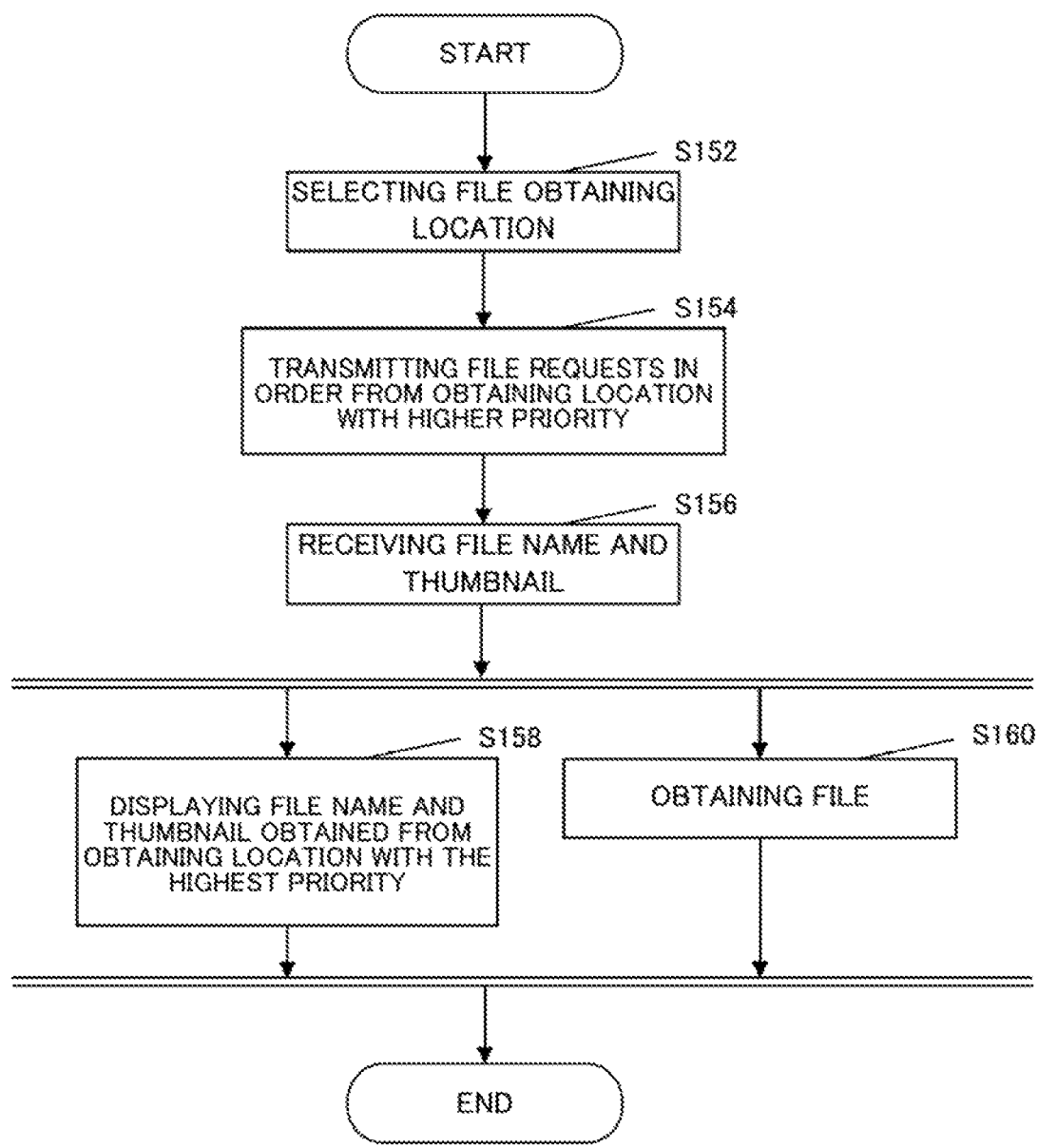
FIG. 12 is a diagram for explaining an initial screen displaying process in the first embodiment.

Note that, in the flow illustrated in FIG. 12, the process of displaying the file name and the thumbnail and the process of obtaining the file are performed in a parallel manner. However, the processes may be sequentially executed. Further, a part or all of the processes of S154 through S160 may be performed in a parallel manner. For example, in a case where there are multiple file obtaining locations, the series of processing of transmitting a file request to each file obtaining location, obtaining a file name and a thumbnail, and obtaining a file may be executed in a parallel manner.

With the above-described processes, it is possible to display a file that can be used during a conference in the recommendation area, based on the priority in the file obtaining location information 254.

Figure 11:
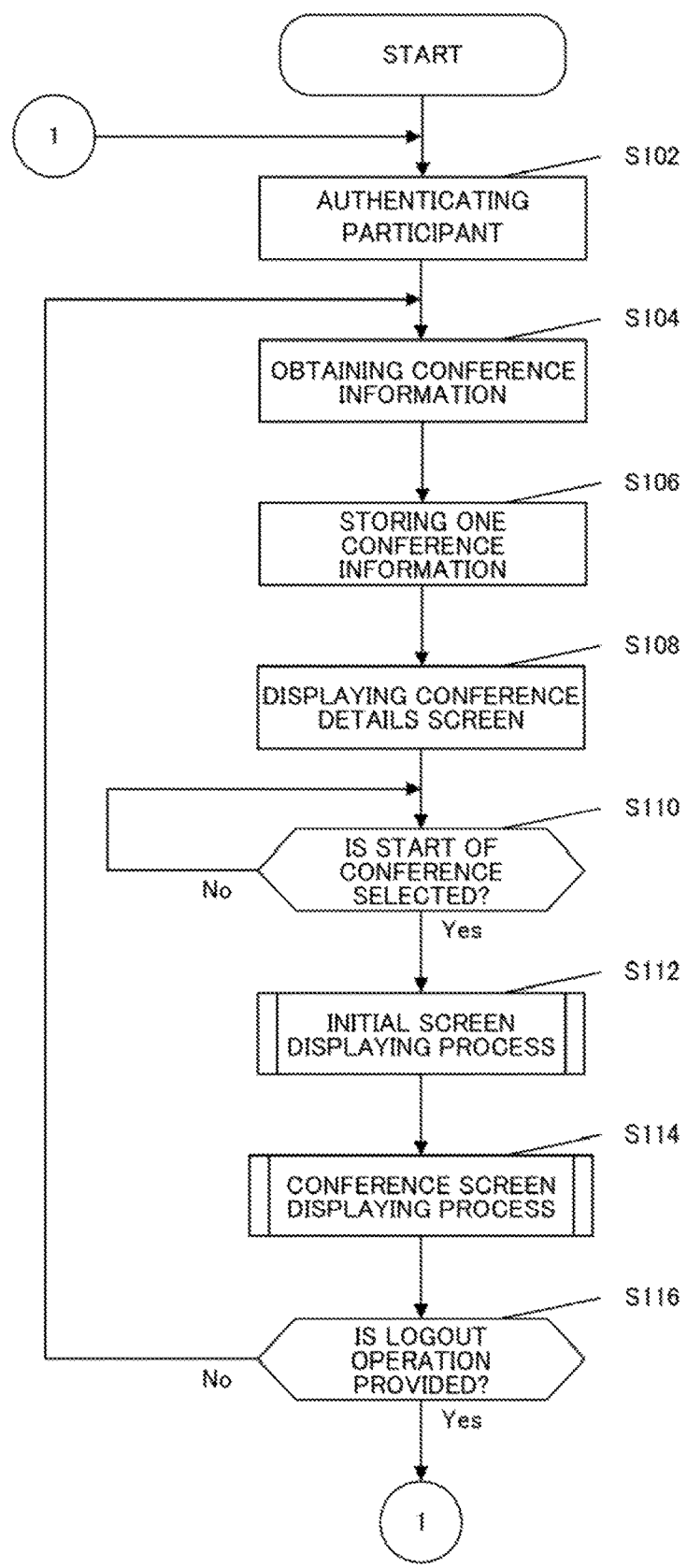
FIG. 11 is a diagram for explaining processing performed by the conference room client in the first embodiment.

Next, returning to FIG. 11, a conference screen displaying process is performed. The conference screen displaying process is a process of displaying screens for a conference on the display unit 210 while a conference is being held. The conference screen displaying process is explained with reference to FIG. 13.

First, the control unit 200 determines whether an operation to display a file obtained from a file obtaining location is provided by a participant (Step S172). Here, an operation to display a file is, specifically, an operation of tapping on a thumbnail displayed in the recommendation area or clicking on a thumbnail using a mouse.

Subsequently, in a case where an operation to display a file is provided, the control unit 200 displays the file on the display unit 210 in accordance with the operation provided by the participant (Step S174 in a case of Yes in Step S172). Specifically, based on the file type displayed in the recommendation area and the thumbnail file name of the selected thumbnail, the control unit 200 specifies the corresponding file name from the obtained file information 258. Furthermore, the control unit 200 extracts the file corresponding to the file name from the file storage area 256 and displays the file on the display unit 210.

Subsequently, the control unit 200 determines whether an operation to change file types to be displayed in the recommendation area is provided by the participant, that is, whether an operation to change the file type selected in the file type selecting list to another file type is provided (Step S176).

In a case where an operation to change file types to be displayed in the recommendation area is determined to be provided by the participant, the control unit 200 displays, in the recommendation area, a thumbnail corresponding to the selected file type from among the thumbnails received in Step S154 (Step S178).

Subsequently, the control unit 200 determines whether to be a case of ending the conference (Step S180). A case of ending the conference is, for example, a case where the end of the conference is selected by the participant or a case where the current time has passed the ending date and time of the conference information. In a case of ending the conference, the control unit 200 deletes from the file storage area 256 the files obtained from the file obtaining locations and ends the conference screen displaying process (Step S182 in a case of Yes in Step S180). Further, the control unit 200 deletes the conference information 252 and the obtained file information 285 as well (Step S184). In a case where the end of the conference is not selected (No in Step S180), the process returns to Step S172.

Returning to FIG. 11, the control unit 200 determines whether a logout operation has been provided by the participant (Step S116). In a case where a logout operation is determined to have been provided, the process returns to the process of authenticating a participant (Step S102 in a case of Yes in Step S116). In a case where a logout operation is determined to have not been provided, the process returns to the process of obtaining conference information (Step S104 in a case of Yes in Step S116).

[1.5 Operation Example]
[1.5.1 Screen Transition Example]

An operation example of the present embodiment is explained with reference to the drawings. First, screen transition of screens displayed on the display unit 210 of the conference room client 20 is explained with reference to FIG. 14. First, a screen for prompting authentication of a participant is displayed (c.f., FIG. 14 (*a*)). On the screen, an authentication method may be displayed, or a text box for entering authentication information may be displayed. Further, in a case where authentication is not required, a start button or the like may be displayed.

Subsequently, in a case where an authentication result transmitted from the conference information management server 10 is "authentication succeeded", the conference room client 20 manages the participant who has been authenticated as being in a login state and obtains, from the conference information management server 10, conference information of the conference participated by the participant. In a case where authentication is not required, this step is skipped and the process proceeds to a step of obtaining conference information.

Figure 14:
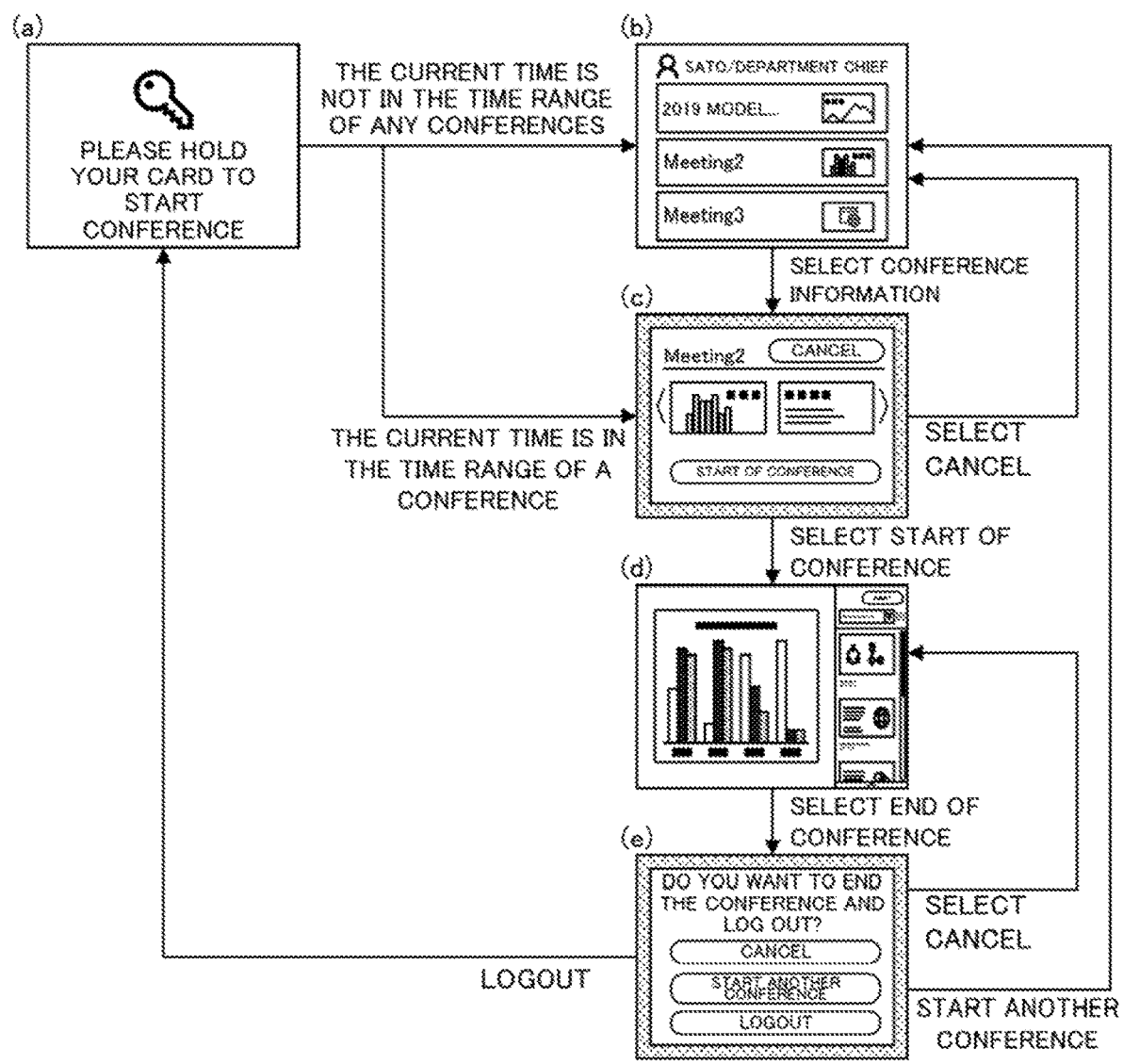
FIG. 14 is a diagram for explaining screen transition in the first embodiment.

In a case where the conference information obtained from the conference information management server 10 includes conference information whose time range of the conference covers the current time, the control unit 200 stores the conference information as conference information 252 and displays a conference details screen based on the conference information 252 on the display unit 210 (c.f., FIG. 14 (*c*)).

In a case where there is no conference information whose time range of the conference corresponds to the current time, the control unit 200 displays on the display unit 210 a list of conference information obtained from the conference information management server 10 so as to allow the participant to select conference information (c.f., FIG. 14 (*b*)).

In a case where conference information is selected by the participant, the control unit 200 stores the selected conference information as the conference information 252 and displays a conference details screen based on the conference information 252 on the display unit 210 (c.f., FIG. 14 (*c*)).

Subsequently, in a case where the start of the conference is selected by the participant on the conference details screen, the control unit 200 displays the conference screen on the display unit 210 (c.f., FIG. 14 (*d*)). Furthermore, in a case of not starting a conference, a screen for selecting conference information is displayed.

In a case where the end of the conference is selected by the participant while the conference screen is being displayed, the control unit 200 displays on the display unit 210 a screen for confirming the end of the conference and instructs the participant to select a method for ending the conference (c.f., FIG. 14 (*e*)). In the present embodiment, the explanation is provided on the basis that canceling, starting another conference, or logging out may be selected as a method for ending the conference.

Here, in a case where logging out is selected by the participant, a screen for prompting authentication of a participant is displayed (c.f., FIG. 14 (*a*)). In a case where starting another conference is selected by the participant, a screen for selecting conference information is displayed (c.f., FIG. 14 (*b*)) for allowing the participant to newly start a conference. In a case where cancelling is selected by the participant, a screen for conference is displayed (c.f., FIG. 14 (*d*)).

[1.5.2 Example of Operation Screen]

Figure 15A:
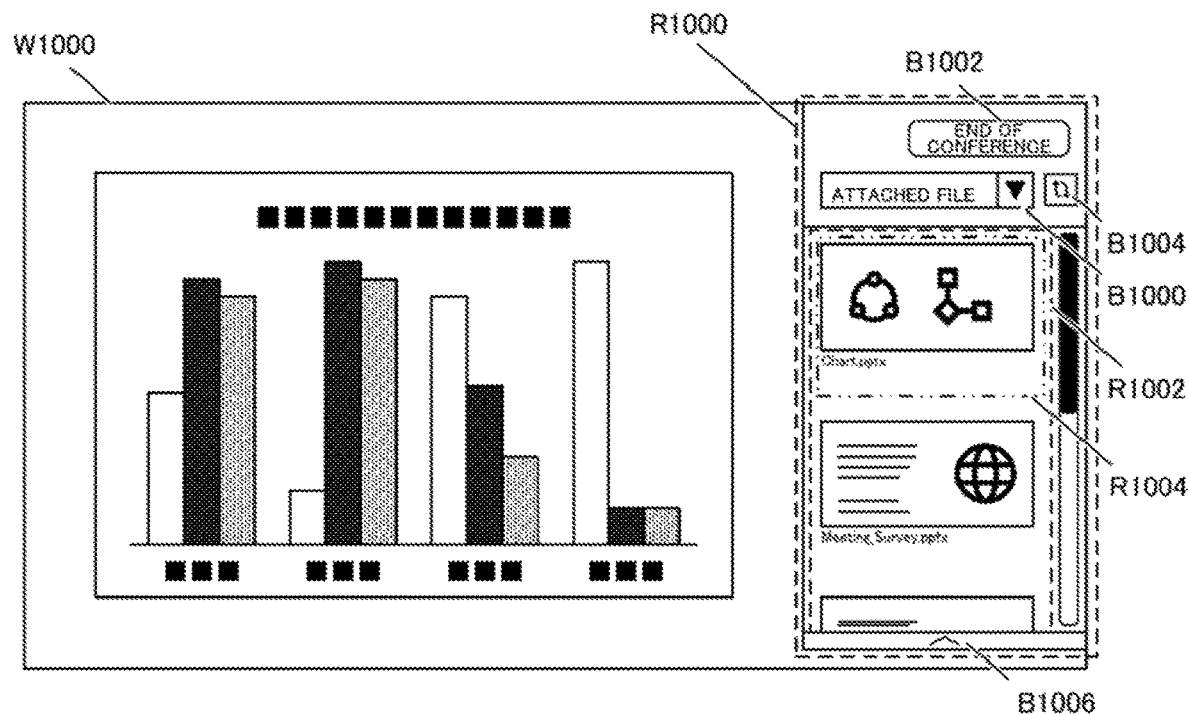
FIG. 15A and FIG. 15B are diagrams for explaining an operation example in the first embodiment.

Next, a screen to be displayed in the present embodiment is explained with reference to the drawings. First, the conference screen is explained with reference to FIG. 15. FIG. 15A is an example of a display screen W 1000 in the present embodiment. In the display screen W 1000, a conference application and a recommendation area R1000 are displayed such that the recommendation area R1000 overlaps the conference application. In the recommendation area R1000, an area R1002 in which s thumbnail and s file name are displayed for each file, a file type selecting list B1000, and a button B1002 for providing an operation to end the conference. Furthermore, an update button B1004 for updating the display of the area R1002 and a button B1006 for shrinking the recommendation area R1000 are included.

In the area R1002, a thumbnail and a file name are displayed for each file. For example, in the area R1004, file name "Chart.pptx" and a thumbnail of the file are displayed. Participants of the conference can select a file to be used based on the display of the area R1002.

Figure 15B:
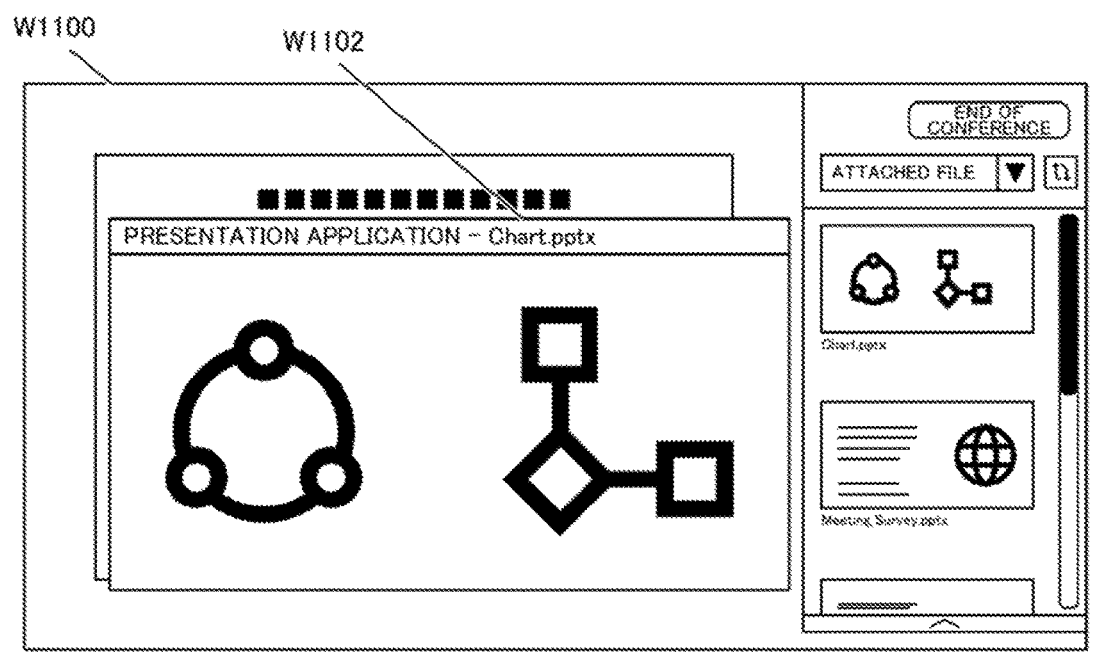

FIG. 15B illustrates an example of a display screen W 1100 in a case where the area R1004 is selected on the display screen W 1000. Here, the file corresponding to "Chart.pptx" is displayed from among files stored in the file storage area 256 (c.f., W 1102).

Figure 16A:
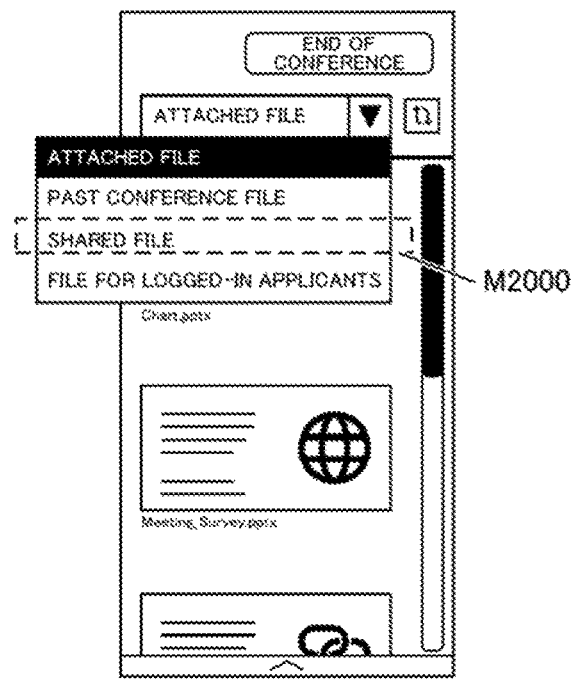
FIG. 16A and FIG. 16B are diagrams for explaining an operation example in the first embodiment.
Figure 16B:
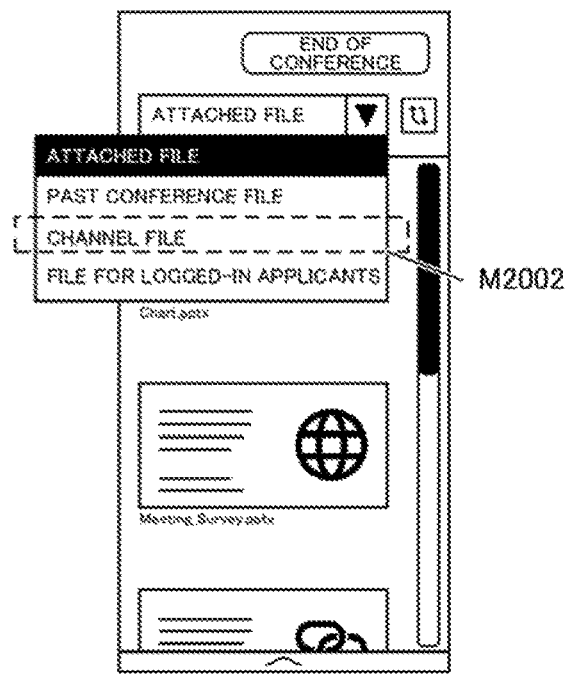

Subsequently, the file type selecting list is explained with reference to FIG. 16. FIGS. 16A and 16B are display examples in a case where an operation to expand a list is provided by a participant on the file type selecting list B1000 in FIG. 1S. Here, FIGS. 16A and 16B differ in terms of service IDs stored in the conference information 252. Available file types are different, depending on the service ID. Particularly, items indicated by M2000 and M2002 are different.

Figure 17A:
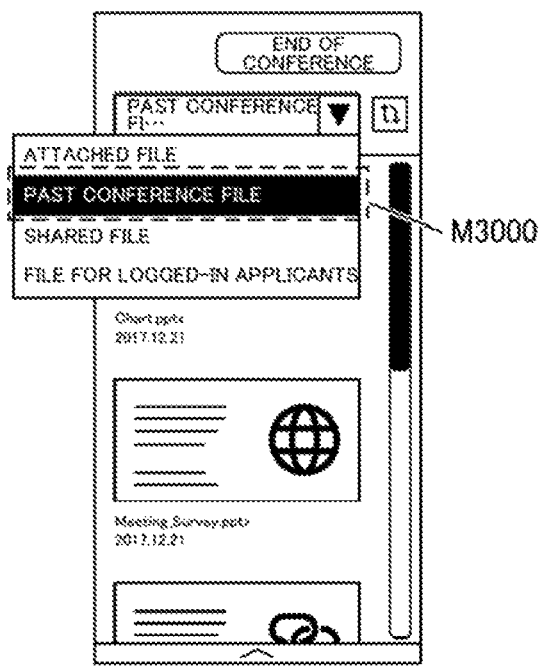
FIGS. 17A through 17C are diagrams for explaining an operation example in the first embodiment.

Next, a screen example in a case of displaying a file of past conferences is explained with reference to FIG. 17. First, an item (M3000) of the "past conference file" is selected by the participant from the file type selecting list (c.f., FIG. 17A). Here, the control unit 200 displays date display L3000 and buttons B3000 and B3002 for selecting date in the file type selecting list on the display unit 210 (c.f., FIG. 17B).

Note that, in the date display L3000, there may be displayed the latest date or a date of a day when a conference was held, from among dates that can be designated as file obtaining locations of past conference files.

Figure 17B:
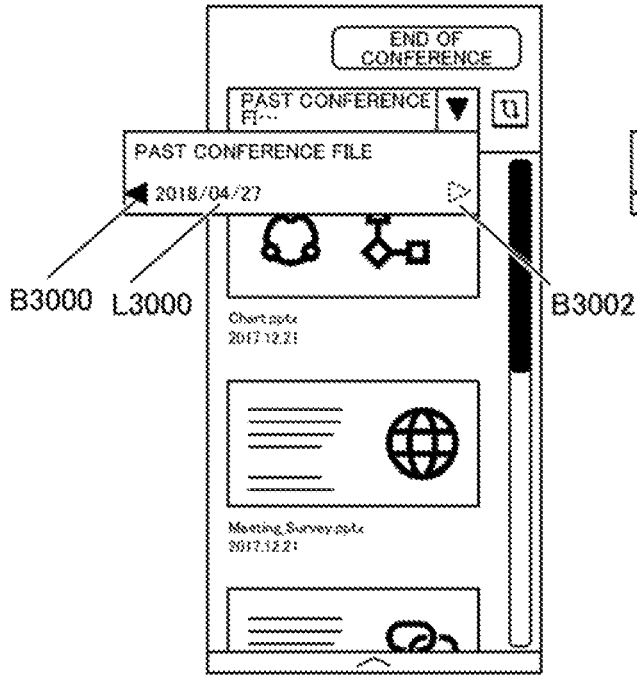
Figure 17C:
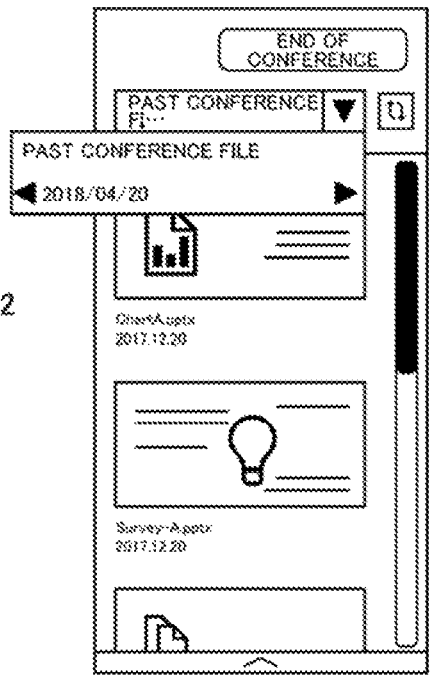

Furthermore, in a case where the button B3000 or B3002 is selected by a participant, the control unit 200 changes the date displayed in the date display L3000 (c.f., FIG. 17B). For example, in a case where the button B3000 is selected, a date earlier than the currently selected date is displayed. Further, in a case where the button B3002 is selected, a date later than the currently selected date is displayed. In a case where it is not possible to change to the date displayed in the date display L3000 to a future or past date, the button B3000 or B3002 may be displayed such that the button l33000 or l33002 cannot be selected by the participant.

In a case where a past conference file is selected or in a case where a date is changed due to an operation by a participant, the control unit 200 changes thumbnails displayed in the recommendation area, based on the date displayed in the date display L3000. For example, in FIG. 17B, since the date displayed in date display L3000 is "2018/04/27", a file of a conference held on Apr. 27, 2018 is displayed in the recommendation area. Here, it is assumed that the button B3000 is selected by the participant so as to be in the state of FIG. 17C. Here, in FIG. 17C, since the date displayed in date display L3000 is "2018/04/20", a file of a conference held on Apr. 20, 2018 is displayed in the recommendation area.

Here, whether to display an icon to select a date in file type selecting list B1000 may be determined based on whether [date] is included in file obtaining locations of the file obtaining source information 254. That is, in a case where a date can be included in the file obtaining location corresponding to a file type, a date included in the file obtaining destination is displayed such that a participant can select the date.

Furthermore, selectable dates may be obtained at the time of starting a conference or may be obtained by inquiring file obtaining locations of past conference handouts each time the button B3000 or B3002 for selecting a date is operated.

Especially, in a case where conferences were held many times in the past, it takes time to obtain thumbnails of all past conference handouts. Therefore, with such a behavior as obtaining thumbnails when a date is selected, the time to obtain thumbnails can be reduced.

Note that, instead of obtaining thumbnails each time a date is selected, thumbnails of handouts used in conferences held a predetermined number of times before a conference may be obtained at the time of starting the conference. In this case, it is possible to shorten the processing time taken to refer to handouts related to conferences recently held.

According to the present embodiment, it is possible to obtain file, based on conference information 252 and file obtaining location information 254, regardless of the service used for booking a conference. Therefore, it is possible for a participant to use the file without being aware of the service used for booking the conference. Therefore, improvement of convenience is expected.

Further, by setting priority to file obtaining locations for each service, a file highly relevant to a conference is displayed in the recommendation area when starting the conference even though there are multiple types of files.

Furthermore, by obtaining a file in the background while the participant is checking the thumbnails displayed in the recommendation area, it is possible to reduce the waiting time for obtaining files.

Note that, although a file request is transmitted to all file obtaining locations in order based on priority of file obtaining locations in the explanation of the present embodiment, the file request may be transmitted only to the file obtaining location having the highest priority at the time of starting a conference. Here, in a case where a file obtaining location of an unobtained file is selected when file types are changed, the file request is provided to the file obtaining location and the recommendation area is updated. In the above way, the file request is provided only when necessary. Therefore, it is possible to prevent the conference room client 20 from receiving undesired files in the background.

Furthermore, although a file obtaining location is determined based on conference information 252 and file obtaining location information 254 in the explanation of the present embodiment, the conference information obtained from the conference information management server 10 may include the file obtaining location. In a case where the file obtaining location is included in the conference information, it is possible to omit the process in Step S152, in which the control unit 200 selects the file obtaining location.

Furthermore, although a service ID is used to identify a service in the present embodiment, the service ID may not be stored in a case where it is possible to determine the service by use of information other than the service ID. For example, in a case where a channel name is set as additional information, it is conceivable that the service is determined to be Service B. In this case, the service is determined based on the information with which the service can be identified. Furthermore, a file obtaining location may be determined based on additional information or information with which the service can be identified as well. For example, in a case where a channel name is included in additional information of the conference information 252, file obtaining location information for obtaining a file from a predetermined file obtaining location may be stored, for example.

In addition, it is possible that the conference information includes information about the place where a conference is held. Here, by including the information about the place in the conference room client 20, it is possible to detect the conference to be held by use of the conference room client 20 in advance. Therefore, by obtaining the file from the file obtaining location before the conference is started, it is possible to reduce the waiting time when obtaining the file.

Here, the file obtained in advance may be formed into a usable state, based on the extension/application association list 260. In this way, the file to be use is displayed at the time of starting the conference. Therefore, the operation of selecting a thumbnail can be omitted.

Note that, the conference information management server 10 obtains booking information and manages the booking information as conference information in the explanation of the present embodiment, the conference room client 20 may obtain booking information and manage the booking information as the conference information. In this case, information (for example, authentication information for logging in to a connection destination or a service server) of the service server connected by the conference room client 20 is stored in the memory unit 250 of the conference room client 20. In addition, booking information may be obtained by the conference room client 20 in a regular basis or after a participant is authenticated.

2. Second Embodiment

Next, the second embodiment is explained. In the present embodiment, as a thumbnail to be displayed in the recommendation area at the time of starting a conference, a thumbnail obtained from a file obtaining location, in which a file exists, is displayed. Note that, since the overall configuration and the functional configuration are the same as those of the first embodiment, explanation thereof is omitted.

Figure 18:
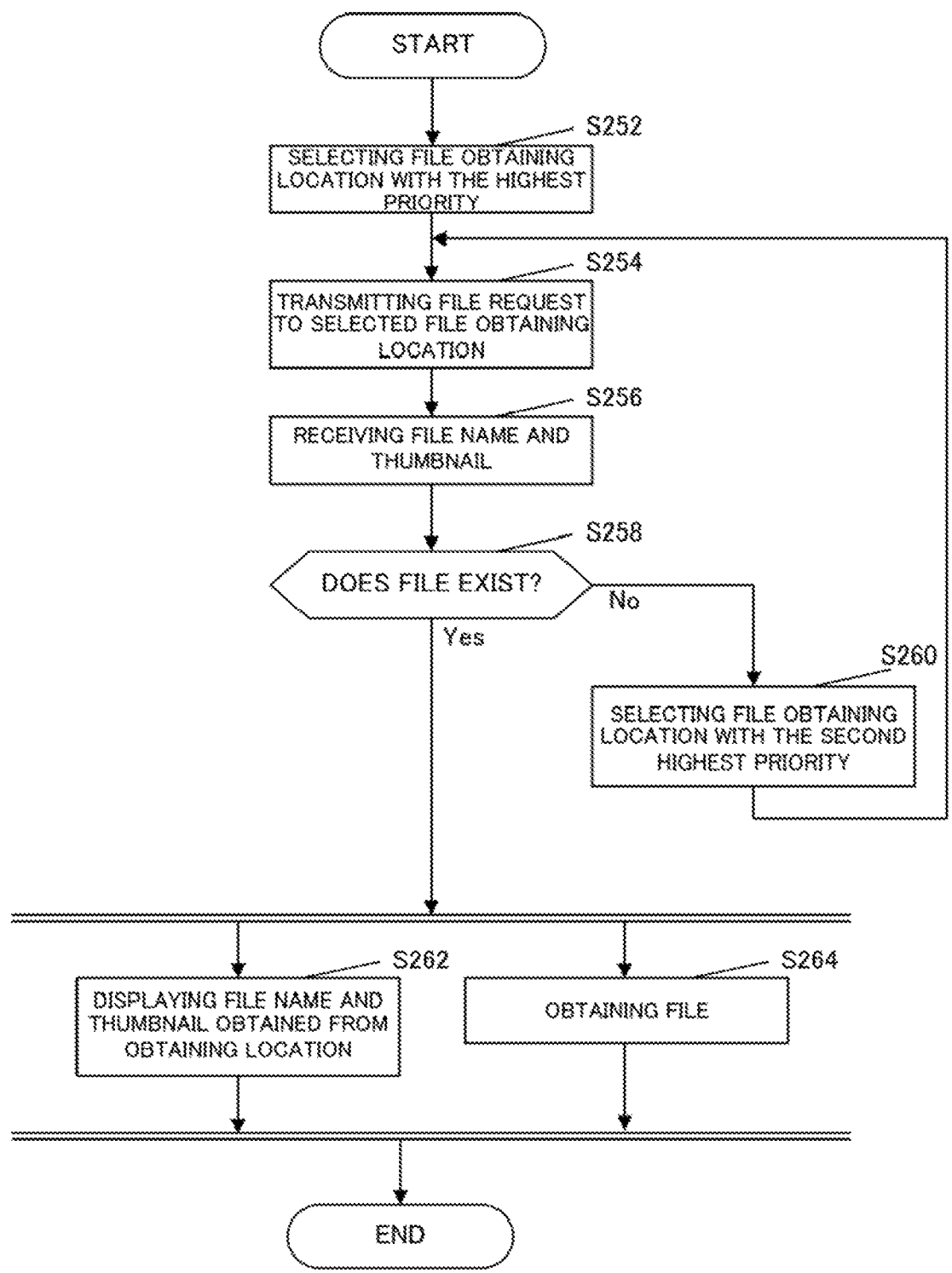
FIG. 18 is a diagram for explaining an initial screen displaying process in the second embodiment.
Figure 19:
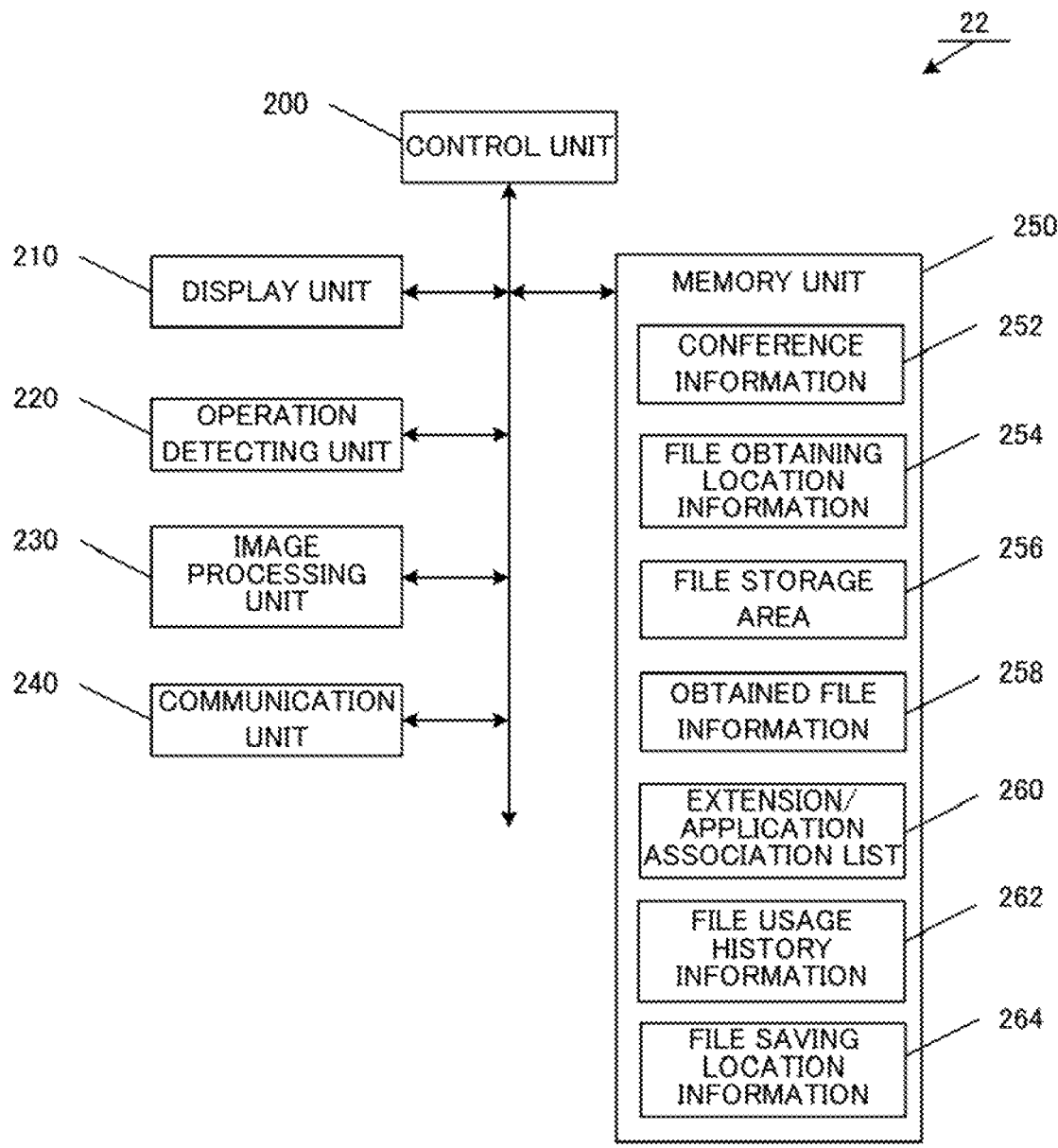
FIG. 19 is a diagram for explaining a functional configuration of a conference room client in the third embodiment.

In the present embodiment, the flow of the initial screen displaying process by the conference room client 20 in the first embodiment as illustrated in FIG. 12 is replaced with the flow illustrated in FIG. 18. The initial screen displaying process in the present embodiment is explained with reference to FIG. 18.

First, the control unit 200 retrieves from the file obtaining location information 254 a file obtaining location, in which the file related to the conference is stored, based on the service ID of the conference information 252 and selects the file obtaining location (Step S152).

Subsequently, regarding the file obtaining location selected in Step S252, the control unit 200 transmits a file request to a device corresponding to the file obtaining location. (Step S254) Furthermore, the control unit 200 receives a file name and a thumbnail transmitted from the device having the file obtaining location as a response to the file request (Step S256).

Subsequently, the control unit 200 determines whether a file exists in the file obtaining location (Step S258). For example, in a case where one or more thumbnails or file names are obtained from the file obtaining location, it is determined that a file exists.

In a case where the control unit 200 determines that a file does not exist in the file obtaining location, the control unit 200 selects the file acquisition destination having the second highest priority from among the file obtaining locations stored in the file obtaining location information 254 (Step S260 in a case of NO in Step S258). In addition, the control unit 200 transmits a file request to the selected file obtaining location (Step S254).

In a case where it is determined in Step S258 that a file exists in the file obtaining location (Yes in Step S258), the control unit 200 displays the file name and the thumbnail obtained from the file obtaining location in the recommendation area (Step S262). Furthermore, the file is obtained from the file obtaining location in the background and stored in the file storage area 256 (Step S264).

Through the processing described above, it is possible to set a thumbnail displayed in the recommendation area at the time of starting a conference in accordance with situations of file obtaining locations. For example, referring to the file obtaining location information 254 illustrated in FIG. 8, in a case where the service used for booking a conference is Service A, the conference room client 20 firstly transmits a file request to the file obtaining location where an attached file is stored.

In a case where a file is attached when a conference is booked, the thumbnail of the attached file is displayed in the recommendation area. In a case where a file is not attached when a conference is booked, a file request is transmitted to a file obtaining location where a past conference file is stored, which is the file obtaining location having the second highest priority. In a case where a past conference file is stored, the thumbnail of the past conference file is displayed in the recommendation area.

In the present embodiment, a thumbnail is acquired from a file obtaining location based on the priority and displayed in the recommendation area. Therefore, it is possible to display an available file in the recommendation area without providing an operation to select a file type, which is provided by a participant at the time of starting a conference.

3. Third Embodiment

Next, the third embodiment is explained. In this embodiment, in a case where a file obtained from a file obtaining location is updated, the updated file is saved in a predetermined saving location.

Figure 13:
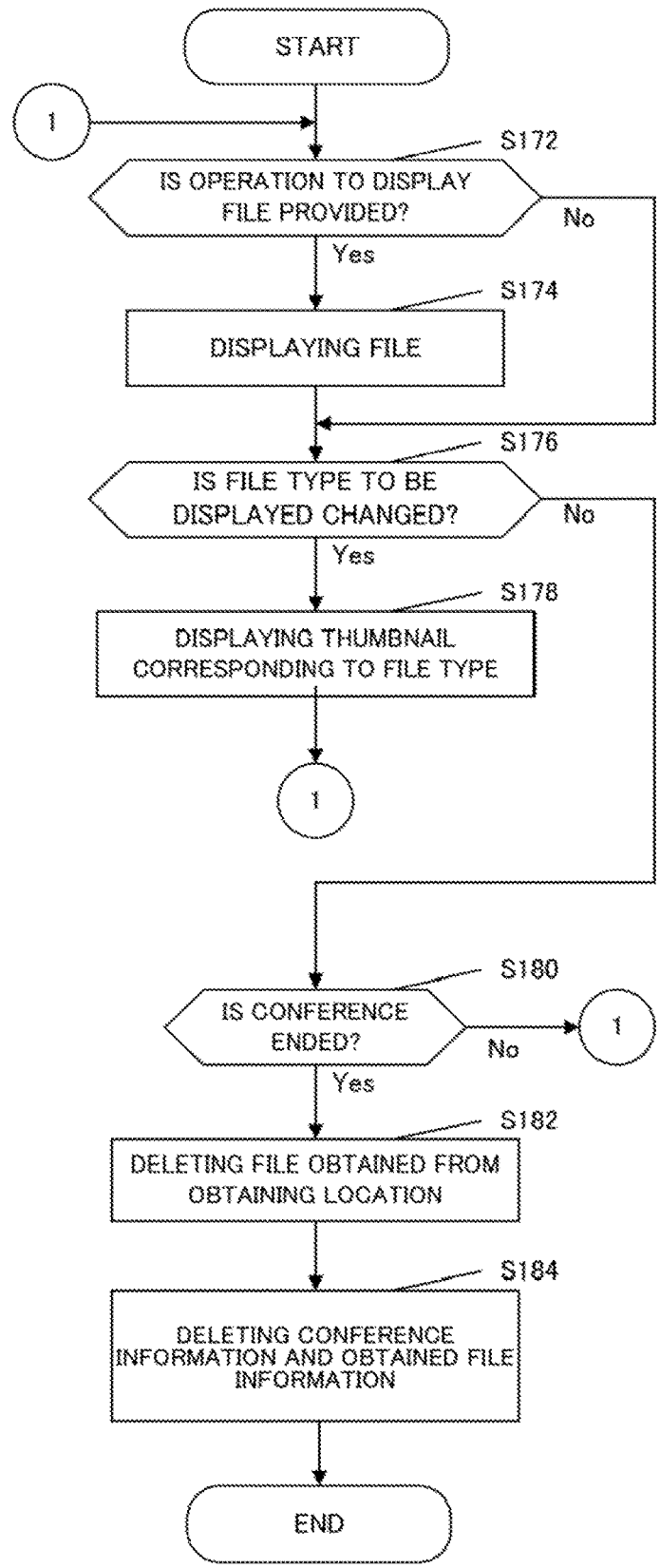
FIG. 13 is a diagram for explaining a conference screen displaying process in the first embodiment.

Note that, in the present embodiment, the functional configuration of the conference room client is different from that of the first embodiment. Therefore, the conference management system 2 of the present embodiment is explained on the basis that the conference management system 2 is connected by the conference information management server 10, the conference room client 22, and the cloud storage 30. Furthermore, in the present embodiment, comparing with the first embodiment, the functional configuration of the conference room client 22 illustrated in FIG. 7 is replaced with the functional configuration illustrated in FIG. 18. Further, the sequence illustrated in FIG. 10 is replaced with the sequence diagram illustrated in FIG. 20. Further, the flow of the conference screen displaying process illustrated in FIG. 13 is replaced with the flow illustrated in FIG. 21. Note that the same functional parts and processes as those in the first embodiment are assigned with the same reference signs to omit explanation.

[3.1 Functional Configuration of Conference Room Client]

Figure 22:
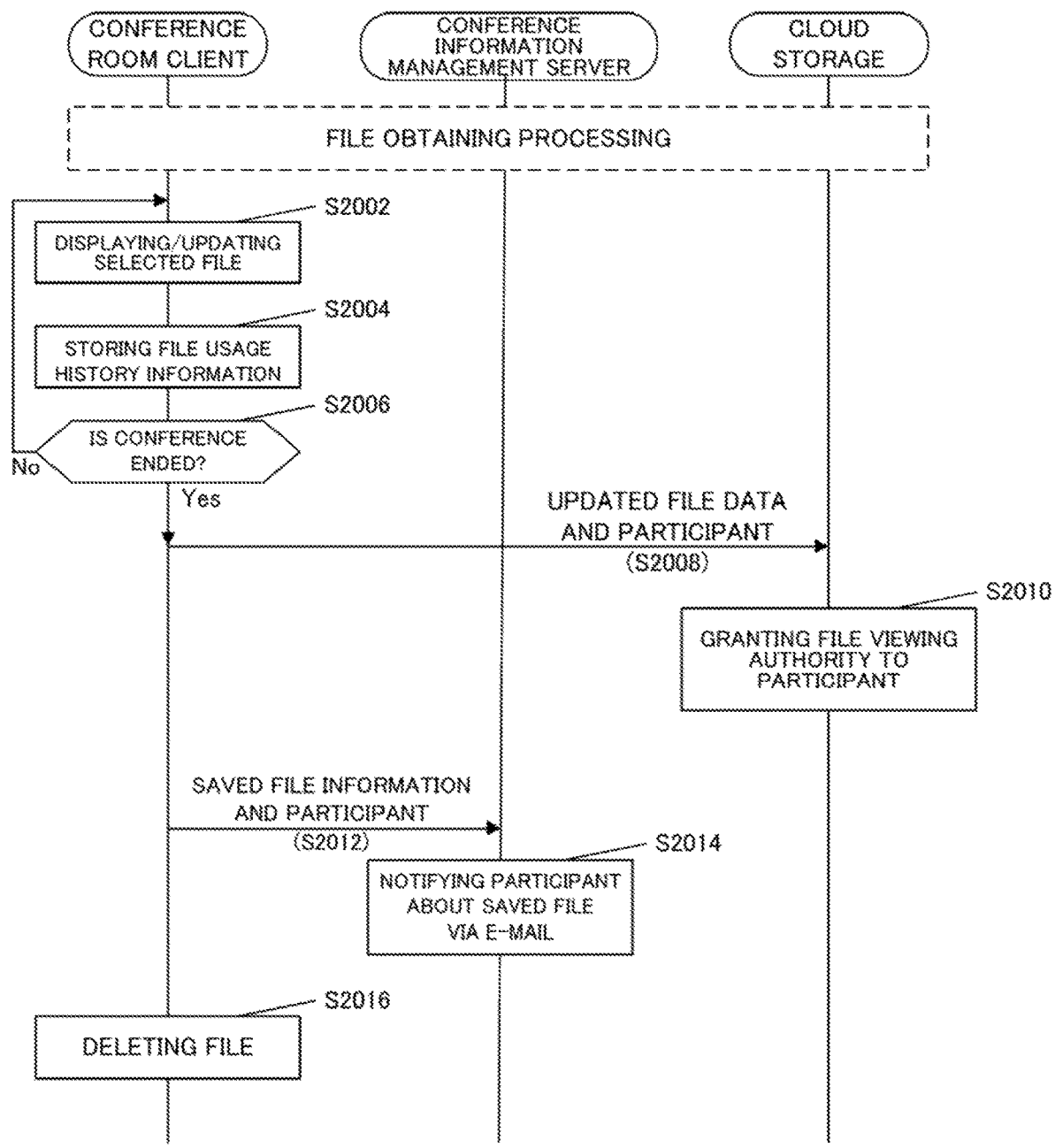
FIG. 22 is a diagram for explaining a sequence in the third embodiment.

Next, a functional configuration of the conference room client 22 is explained with reference to FIG. 22. The memory unit 250 of the conference room client 22 includes conference information 252, file obtaining location information 254, a file storage area 256, obtained file information 258, an extension/application association list 260, file usage history information 262, and file saving location information 264.

In the file usage history information 262, in a case where a file stored in the file storage area 256 is used, the used file and the state of the file are stored in association with each other. For example, as illustrated in FIG. 20, the file name (for example, "meetings.pptx") of a file stored in the file storage area 256 and the state (for example, "UPDATED") of the file are stored.

Here, the case where the file is used is when a file stored in the file storage area 256 is displayed by a participant or when a file is updated due to an operation such as writing to the file. In a case where a file is displayed, the state is stored as "OPENED". Further, in a case where a file is updated, the state is stored as "UPDATED".

In the file saving location information 264, a saving location of an updated file is stored for each service. For example, as illustrated in FIG. 20, a service ID (for example, "SERVICE A") for identifying a service and a saving location (for example, "PAST CONFERENCE FILE") of an updated file are stored.

The file saving location may store a file type stored in the file obtaining location information or may store information indicating the location of a saving location such as a path. In a case where a file type is stored, the same location as the file obtaining location corresponding to the file type of the service is used as the file saving location.

Note that, in the present embodiment, the parts bracketed by "[ ]" of the saving location is parts to insert information according to situations, such as an attribute corresponding to conference information, additional information, an attribute of a participant, or date, as with a file obtaining location of the file obtaining location information 254.

[3.2 Process Flow]
[3.2.1 Overall Process]

Subsequently, the processing in the present embodiment is explained. First, with reference to FIG. 22, data to be transmitted and received between devices is explained. Note that the file obtaining processing illustrated in FIG. 22 is the processing from Step S1002 to Step S1026 of FIG. 10.

Subsequently, in a case where an operation to select a thumbnail is provided by a participant, the control unit 200 of the conference room client 20 displays the file corresponding to the selected thumbnail on the display unit 210. Furthermore, in a case where an editing operation is provided to the displayed file by a participant, the control unit 200 updates the edited file stored in the file storage area 256 (S2002).

Furthermore, in a case where a file is displayed, the control unit 200 stores the file name and file usage history information in which the state is "OPENED" in the file usage history information 262. Furthermore, in a case where a file is updated, the control unit 200 stores the file name and file usage history information in which the state is "UPDATED" in the file usage history information 262 (Step S2004).

Subsequently, the control unit 200 determines whether the conference is ended (Step S2006). In a case where the conference is ended, the file data of the updated file and the data of the participant of the conference are transmitted to the file saving location (e.g., cloud storage) corresponding to the service, based on the file usage history information 262 (Step S2008). Furthermore, the device to be the file saving location grants viewing authority of the file received from the conference room client 22 to the participant of the conference, so as to enable the participant of the conference to view the transmitted file (S2010).

Furthermore, the conference room client 22 transmits the saved file information, such as the name of the saved file and a link address from which the transmitted file can be obtained, and the data of the participant of the conference to the conference information management server 10 (S2012). The conference information management server 10, which has received the saved file information and the data of the participant of the conference extracts the participant's e-mail address from the participant information 124 based on the data of the participant, and transmits information about the transmitted file to the e-mail address.

With Steps S2008 to S2014, participants of a conference can share an updated file. Note that, after transmission of the file is completed, the file stored in the conference room client 20 is deleted (Step S2016).

[3.2.2 Flow of Conference Screen Displaying Process]

Figure 23:
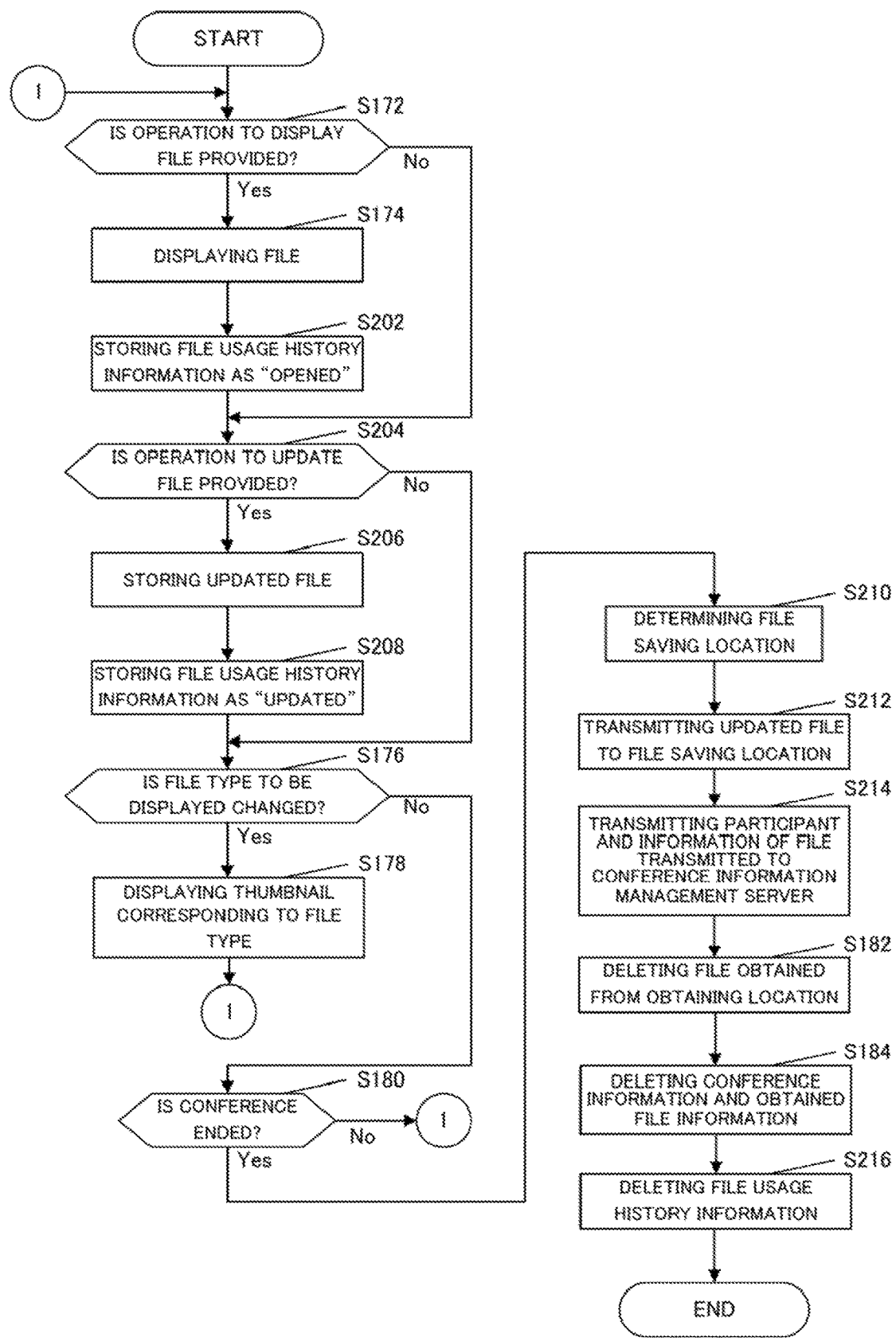
FIG. 23 is a diagram for explaining a conference screen displaying process in the third embodiment.

Subsequently, the conference screen displaying process according to the present embodiment is explained with reference to FIG. 23. First, in a case where an operation to display a file is provided by a participant (Step S172), the control unit 200 displays the file on the display unit 210 (Step S174) and stores the file name and file usage history information in which the state is "OPENED" in the file usage history information 262 (Step S202). Note that, regarding the file name, the file name corresponding to the thumbnail selected as the operation to display the file is obtained from the obtained file information 258.

Subsequently, the control unit 200 determines whether an operation to update a file has been provided by a participant (Step S204). The operation to update a file may be, for example, an operation through which a participant performs writing on a displayed file or edits the contents of a displayed file by proving a touch operation.

In a case of determining that an operation to update a file is provided, the updated file is stored in the file storage area 256 (Step S206 in a case of Yes in Step S204). Furthermore, regarding the file, the file name and file usage history information in which the state is "UPDATED" are stored in the file usage history information 262 (Step S208).

Subsequently, the control unit 200 determines whether to be a case of ending the conference (Step S180). In a case where the control unit 200 determines that the conference is ended (Yes in Step S180), the control unit 200 transmits the file updated in the conference to a file saving location corresponding to the service of the conference information 252. First, the control unit 200 determines a saving location corresponding to the service from the service ID stored in the conference information 252 based on the file saving location information 264 (step S210). Furthermore, the control unit 200 extracts the updated file based on the file usage history information 262 and transmits the updated file to the saving location determined in Step S210 (Step S212).

After the transmission of the updated file is completed, the control unit 200 subsequently transmits the information of the transmitted file and the information of the participant to the conference information management server 10 (Step S214). After the transmission is completed, the control unit 200 deletes the file obtained from the file obtaining location (Step S182). Furthermore, the conference information 252 and the obtained file information 285 are deleted (Step S184). Furthermore, the file usage history information 262 is deleted (Step S216).

According to the present embodiment, it is possible to transmit an updated file to a saving location corresponding to a booking service at the time of ending a conference. Consequently, there is no need for participants of a conference to select a storing location of an updated file by themselves at the time of ending the conference. Therefore, improvement of convenience is expected.

Note that, in a case where the same conference is held at multiple sites, to avoid racing over a file from occurring, it is possible to add a participant ID of a logged-in participant to the end of the saving location. Whether to hold the same conference at multiple sites may be granted as an attribute of conference information or may be determined based on whether a saving location has already existed.

Furthermore, when displaying a file, the displayed file and the application used for displaying the file may be stored. In the above way, when using a specific file, it is possible to display/edit the file using a specific application. For example, in a case where a file to be mainly viewed and a file to be mainly edited are included, it is possible to specify an application to be used for each file.

4. Fourth Embodiment

The fourth embodiment is an embodiment in which an application to be activated at the time of starting a conference can be selected on a conference details screen. For example, in order to have a conference over multiple sites, it is conceivable to activate an audio conversation application or a web conference system at the time of starting the conference.

Figure 24A:
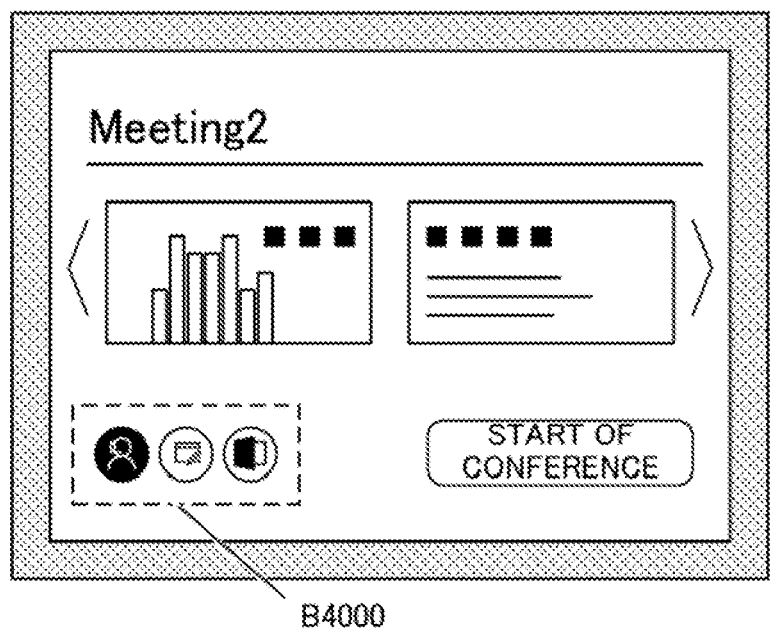
FIG. 24A and FIG. 24B are diagrams for explaining an operation example in the fourth embodiment.

For example, as illustrated in FIG. 24A, a button for designating an application to be activated at the time of starting the conference is displayed in an area surrounded by B4000 on the conference details screen. Participants can select an application that they wish to activate. Furthermore, by highlighting the selected button, participants can confirm the application to be activated at the time of starting the conference.

Figure 24B:
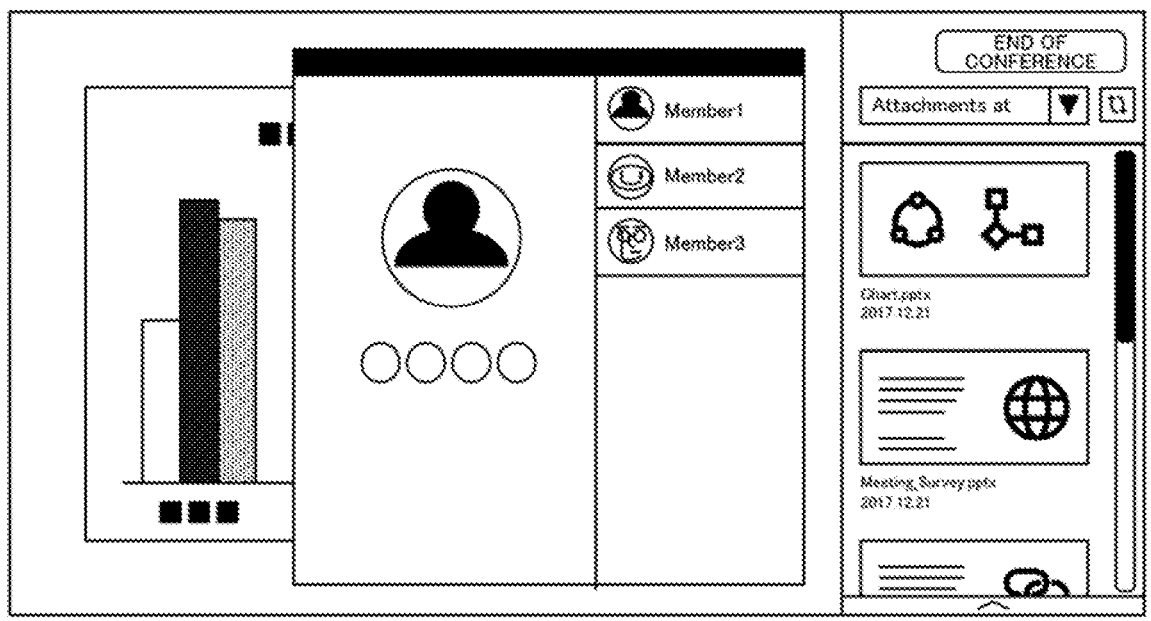

In a case where a participant selects the start-of-conference button, the application selected on the conference details screen is activated and the application is displayed on the display unit 210 when the control unit 200 displays a screen for the conference as illustrated in FIG. 24B.

Note that the conference room client 20 may store selectable applications, a correspondence relation between a service and an application to be activated at time time of starting a conference, etc. Particularly, in a case where an application to be activated every time a conference is started is decided, improvement of convenience is expected.

5. Fifth Embodiment

The fifth embodiment is an embodiment in which, on a screen displaying a list of conference information, a booking service used for booking a conference is distinguishable for each conference information.

Figure 25:
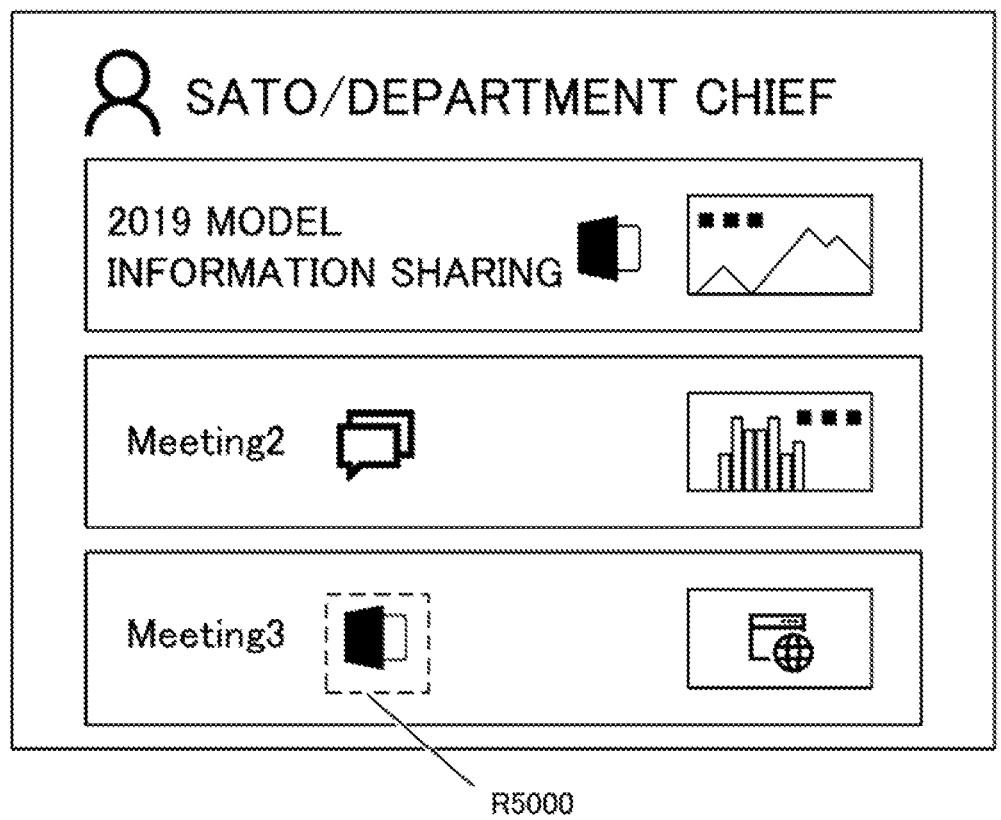
FIG. 25 is a diagram for explaining an operation example in the fifth embodiment.

For example, as enclosed by R5000 on a side of a conference name of conference information in FIG. 25, an icon with which a booking service is distinguished is displayed. Note that, for the sake of distinction, the background color of a panel, the character color of a meeting name, etc., may be displayed in a color corresponding to each service.

The present embodiment is suitable for a case where it is necessary to be conscious of the booking service. For example, in a case where there is a condition of limiting a file obtaining location, a file saving location, or an application to be used in a conference, etc., it is possible to estimate behavior of the conference management system 1 before starting the conference.

6. Sixth Embodiment

The sixth embodiment is an embodiment in which a conference can be extended. For example, a conference extension button is displayed in the recommendation area. In a case where the conference extension button is selected by a participant, the control unit 200 delays the ending date and time of conference information by a predetermined amount of time (e.g., 15 minutes). Furthermore, in a case where a conference is extended, the control unit 200 corrects the ending time of conference information corresponding to the conference information 252. Furthermore, the control unit 200 transmits to the conference information management server 10 a request for performing correction of delaying the ending time and date of the conference information corresponding to the conference information 252.

In the present embodiment, in a case where processing is performed based on an ending time and date, such as a case of determining an end of a conference based on an ending time and date in conference information, the execution of the processing can be delayed. Furthermore, when referring to the conference information after the conference is ended, it is possible to know the actual ending time and date of the conference.

Note that, when extending the conference, the conference information management server 10 may be inquired whether extension of the conference is possible or not. For example, in a case where an ending time and date of a conference overlaps with a starting time of another conference held in the same site if the ending time and date is delayed, it is determined that the conference cannot be extended. In a case where the conference room client 20 receives the determination, a notification that the conference cannot be extended may be provided to participants.

7. Modification Example

Although the embodiments of the present invention have been described above in detail with reference to the drawings, the specific configuration is not limited to the embodiments. Further, designs or the like within the scope not deviating from the gist of the present invention is included in what is claim in the present application as well.

Furthermore, needless to say, each of the embodiments described above can be executed in combination with any of the other embodiments. For example, by executing the third embodiment and the fourth embodiment in a combined manner, it is possible to designate an application to be activated at the time of starting a conference and to transmit an updated file.

Furthermore, a program operating on each device in the embodiments is a program (i.e., a program for causing a computer to function) for controlling the CPU or the like to realize the functions of the embodiments described above. Furthermore, information handled in such a device as described above is temporarily accumulated in a temporary memory device (e.g., RAM) when being processed. Then, the information is stored in a memory device such as an HDD or an SSD (solid state drive) and, if necessary, is read, modified or written by the CPU.

Furthermore, when being distributed to the market, the program can be stored in a portable recording medium, transmitted to a server computer connected via a network such as the Internet, etc. In this case, needless to say, a memory device of the server computer is included in the present invention as well.

What is claimed is:

1. A terminal device connectable to a management server and a file server, the management server being connectable to a plurality of service servers, each of which provides a communication service, the file server storing a file used in the communication service, the terminal device comprising:
   a processor; and
   a memory storing a program that causes the processor to execute control of the terminal device to function as
      a conference information receiving unit configured to receive conference information, which is information about a conference booked through the communication services provided by the plurality of service servers, the conference information being received from the management server,
      a file obtaining location specifying unit configured to specify, as a file obtaining location, a storage location storing the file used in the communication service, on the basis of the conference information,
      a file obtaining unit configured to obtain the file from the specified storage location, wherein the file obtaining unit obtains the file from the file obtaining location specified based on priority information which is associated with the conference information, wherein the file obtaining location is either one of the management server and the file server, and wherein the file is a thumbnail image corresponding to the file, and
      a thumbnail image displaying unit configured to display at least one thumbnail images corresponding to the file obtained by the file obtaining unit,
   wherein the management server stores the file obtained from the storage location storing the file used in the communication service.

2. The terminal device according to claim 1, further comprising a file obtaining location table configured to store the communication service in association with the file obtaining location, wherein the file obtaining location specifying unit specifies the file obtaining location corresponding to the communication service through which the conference is booked, on the basis of the file obtaining location table.

3. The terminal device according to claim 1, further comprising:
- a file saving location table generating unit configured to store a file saving location table in which the file server which is provided to store the file is associated as a saving location with the communication service; and
- a file saving unit configured to, in a case where the obtained file is updated, save the updated file in the file server of the corresponding saving location, on the basis of the file saving location table.

4. The terminal device according to claim 1,
wherein the management server obtains the conference information from at least one of the plurality of service servers, and
wherein the conference information receiving unit of the terminal device transmits a conference information request to the management server and receives the conference information obtained from the management server in response to the conference information request transmitted to the management server.

5. The terminal device according to claim 1,
wherein the plurality of service servers provide the communication services, which are different from each other, and
wherein the management server obtains the conference information about a conference booked through at least one of the communication services.

6. A conference management system comprising a management server, a file server, and a terminal device, the management server being connectable to a plurality of service servers, each of which provides a communication service, the file server storing a file used in the communication service, the terminal device being connectable to the plurality of service servers and the file server,
wherein the management server includes a first processor and a first memory storing a program that causes the first processor to execute control of the management server to function as:
- an obtaining unit configured to obtain information about a conference booked through the communication services provided by the plurality of the service servers;
- a conference information transmitting unit configured to transmit conference information to the terminal device, the conference information including the information about the booked conference and information for specifying the communication service used for booking the conference, and
wherein the management server stores the file obtained from the storage location storing the file used in the communication service, and
wherein the terminal device includes a second processor and a second memory storing a program that causes the second processor to execute control of the terminal device to function as:
- a conference information receiving unit configured to receive the conference information from the management server;
- a file obtaining location specifying unit configured to specify, as a file obtaining location, a storage location storing the file used in the communication service, on the basis of the conference information;
- a file obtaining unit configured to obtain the file from the specified storage location, wherein the file obtaining unit obtains the file from the file obtaining location specified based on priority information which is associated with the conference information, wherein the file obtaining location is either one of the management server and the file server, and wherein the file is a thumbnail image corresponding to the file; and
- a thumbnail image displaying unit configured to display at least one thumbnail images corresponding to the file obtained by the file obtaining unit.

7. A non-transitory storage medium storing a program that causes a computer to execute control of a terminal device connectable to a management server and a file server, the management server being connectable to a plurality of service servers, each of which provides a communication service, the file server storing a file used in the communication service,
the program causes the computer to function as:
- a conference information receiving unit configured to receive conference information, which is information about a conference booked through the communication service, the conference information being received from the management server;
- a file obtaining location specifying unit configured to specify, based on the conference information, a storage location storing the file used in the communication service, the storage location being specified as a file obtaining location;
- a file obtaining unit configured to obtain the file from the specified storage location, wherein the file obtaining unit obtains the file from the file obtaining location specified based on priority information which is associated with the conference information, wherein the file obtaining location is either one of the management server and the file server, and wherein the file is a thumbnail image corresponding to the file; and
- a thumbnail image displaying unit configured to display at least one thumbnail images corresponding to the file obtained by the file obtaining unit,
wherein the management server stores the file obtained from the storage location storing the file used in the communication service.

8. A conference management method for a conference management system comprising a management server, a file server, and a terminal device, the management server being connectable to a plurality of service servers, each of which provides a communication service, the file server storing a file used in the communication service, the terminal device being connectable to the plurality of service servers and the file server,
wherein the conference management method for the management server includes:
- obtaining information about a conference booked through the communication services provided by the plurality of service servers;
- transmitting conference information to the terminal device, the conference information including the information about the booked conference and information for specifying the communication service used for booking the conference, wherein the management server stores the file obtained from the storage location storing the file used in the communication service, and
wherein the conference management method for the terminal device includes:
- receiving the conference information from the management server;
- specifying, as a file obtaining location, a storage location storing the file used in the communication service, on the basis of the conference information;

obtaining the file from the specified storage location, wherein the specified storage location is based on priority information which is associated with the conference information, wherein the file obtaining location is either one of the management server and the file server, and wherein the file is a thumbnail image corresponding to the file, and;

displaying at least one thumbnail images corresponding to the file obtained by the file obtaining unit.

\* \* \* \* \*